(12) United States Patent
Takahashi

(10) Patent No.: US 7,653,236 B2
(45) Date of Patent: Jan. 26, 2010

(54) SURFACE INSPECTION DEVICE AND METHOD

(75) Inventor: Naohiro Takahashi, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 440 days.

(21) Appl. No.: 11/058,645

(22) Filed: Feb. 16, 2005

(65) Prior Publication Data

US 2006/0056676 A1 Mar. 16, 2006

(30) Foreign Application Priority Data

Sep. 10, 2004 (JP) ............................. 2004-263391
Oct. 29, 2004 (JP) ............................. 2004-315078

(51) Int. Cl.
*G06K 9/00* (2006.01)
*H04N 5/253* (2006.01)
*H04N 7/18* (2006.01)
*G01N 21/00* (2006.01)

(52) U.S. Cl. ......................... 382/145; 348/87; 348/126; 356/237.1

(58) Field of Classification Search ......... 382/141–152; 250/306–311, 223; 348/86–95, 125–134; 700/95–212; 438/16; 356/237.7–237.6, 356/426–431
See application file for complete search history.

(56) References Cited

U.S. PATENT DOCUMENTS

| | | | | |
|---|---|---|---|---|
| 5,392,113 A | * | 2/1995 | Sayka et al. | 356/237.5 |
| 5,877,035 A | * | 3/1999 | Fujino et al. | 438/16 |
| 6,028,664 A | * | 2/2000 | Cheng et al. | 356/237.4 |
| 6,157,444 A | * | 12/2000 | Tomita et al. | 356/237.1 |
| 6,255,127 B1 | * | 7/2001 | Fujino et al. | 438/16 |
| 6,559,457 B1 | * | 5/2003 | Phan et al. | 250/491.1 |
| 6,724,005 B2 | * | 4/2004 | Tokumoto | 250/559.4 |
| 6,768,542 B2 | * | 7/2004 | Ise et al. | 356/237.2 |

(Continued)

FOREIGN PATENT DOCUMENTS

JP 10-135288 5/1998

(Continued)

OTHER PUBLICATIONS

Partial translation of Japanese Patent Office Action dated May 27, 2008, issued in corresponding Japanese Patent Application No. 2004-315078.

(Continued)

*Primary Examiner*—Aaron W Carter
(74) *Attorney, Agent, or Firm*—Westerman, Hattori, Daniels & Adrian, LLP

(57) ABSTRACT

Disclosed is a surface inspection device that performs a defect inspection throughout a surface of a wafer. In the defect detection using a defect review SEM, an X-Y coordinate system is set throughout a surface (excluding a round end face) of a product wafer to allow the inspection throughout the surface of the product wafer. Therefore, the defect detection can be performed also in an area other than an effective chip area. Further, the inspection results of the area are stored in relation to the coordinates in a position where the inspection results are acquired. Therefore, the inspection results can be effectively used for an analysis and a defect cause can be investigated with a higher degree of accuracy. As a result, the quality and yield of chips can be improved.

8 Claims, 26 Drawing Sheets

U.S. PATENT DOCUMENTS

| | | |
|---|---|---|
| 7,197,178 B2 * | 3/2007 | Simpkins .................... 382/145 |
| 2002/0171051 A1 | 11/2002 | Nakagaki et al. |
| 2002/0181756 A1 | 12/2002 | Shibuya et al. |
| 2003/0053046 A1 * | 3/2003 | Ise et al. .................. 356/237.2 |
| 2004/0044484 A1 | 3/2004 | Obara et al. |

FOREIGN PATENT DOCUMENTS

| | | |
|---|---|---|
| JP | 2001-56306 | 2/2001 |
| JP | 2001-091451 A | 4/2001 |
| JP | 2002-310962 A | 10/2002 |
| JP | 2003-059984 A | 2/2003 |
| JP | 2004-153228 A | 5/2004 |

OTHER PUBLICATIONS

Japanese Office Action issued in Japanese Application No. 2004-315078, dated Sep. 30, 2008.

* cited by examiner

SURFACE INSPECTION DEVICE AND METHOD

CROSS-REFERENCE TO RELATED APPLICATIONS

This application is based upon and claims the benefits of priority from the prior Japanese Patent Applications No. 2004-263391, filed on Sep. 10, 2004 and No. 2004-315078, filed on Oct. 29, 2004, the entire contents of which are incorporated herein by reference.

BACKGROUND OF THE INVENTION

1. Field of the Invention

The present invention relates to a surface inspection device and a surface inspection method. More particularly, the present invention relates to a surface inspection device and a surface inspection method for inspecting pattern defects formed on a surface of a sample such as a wafer, or adhesion of foreign matters.

2. Description of the Related Art

In a recent manufacturing process of semiconductor devices, a defect review SEM that inspects pattern defects formed on a wafer, or adhesion of foreign matters (simply referred to as a "defect") through the use of a Scanning Electron Microscope (SEM) is being used.

The inspection of sample surfaces using such a defect review SEM is performed as follows. First, a defect inspection device such as an appearance inspection device or a laser type surface foreign matter inspection device performs an inspection of a wafer to be inspected, and thereby acquiring data of the inspection results. The inspection data include, for example, the number, coordinates, size of defective spots on the wafer to be inspected, in addition to product number, lot, ID of wafer to be inspected, process inspection device and date. Then, using such review data, the defect review SEM performs, for example, an automatic alignment between the coordinates of a defective spot in the inspection data and those of the surface of the wafer to be inspected, and performs a detailed defect review of the defective spot through the use of an SEM. Finally, the defect review SEM creates SEM image data (image data) of the defective spot. Some defect review SEMs automatically perform the defect classification or elemental analysis on the detected defects.

However, in various surface inspection devices including conventional defect inspection devices or defect review SEMs, the coordinates of the surface of the wafer to be detected are set, for example, only in an area (referred to as an "effective chip area") where a chip capable of being used as a product is formed. Accordingly, the defect detection can be automatically performed only within this effective chip area.

In an area other than the effective chip area, the following defect detection must be performed aside from the automatic defect detection in the effective chip area. That is, an operator performs an SEM observation by manually turning the wafer to be inspected, using a joy stick or drag ball attached to the defect review SEM. Whenever finding defective spots, the operator records SEM image data or takes photographs thereof.

However, it is difficult for the operator to completely find defective spots on the wafer to be inspected, through these operations. Furthermore, considerable time is required. In addition, the SEM image data or SEM photographs acquired through these operations are not related to the inspection data of the defect inspection device. Therefore, the operator hardly specifies a correct position or generation source of the defects even if he/she can find occurrence of the defects or classifies types of the defects.

Conventionally, the following device is proposed. In order to shorten the amount of inspection time, the device detects the inspection data in a rotary scanning area and in an XY advancing scanning area. The rotary scanning area is an area where the wafer to be inspected is inspected while being rotated in a ring shape or in spirals. The XY advancing scanning area is an area where the wafer to be inspected is inspected while being moved straight in the directions of X and Y. After detecting the inspection data, the device detects the defects in each coordinate position using the data (see, Japanese Unexamined Patent Publication No. 2001-056306).

Conventionally, the following system also is proposed. In order to reduce the operation quantity of an operator, the system has a configuration that an optical review device performs a preliminary inspection of a wafer to be inspected, and a defect review SEM performs a detailed inspection of the wafer using preliminary inspection information as the inspection data acquired through the preliminary inspection. The system has a data base that stores review information acquired through the review of the defect to be reviewed, which is selected from the defects included in the preliminary inspection information (see, Japanese Unexamined Patent Publication No. 10-135288).

In an effective chip area of a wafer to be inspected in a manufacturing process of a semiconductor device, elements or wiring patterns are generally formed densely. Therefore, the following problem is raised. Even when defects such as pattern peeling or adhesion of foreign matters, for example, particles are found within the effective chip area by defect detection, it is difficult to specify the generation source or to investigate the generation cause only by the information in some cases. When the surface of the wafer to be inspected is gradually inspected in more detail, the source of these defects is considerably found in an area other than the effective chip area, which heretofore stands outside the area to be inspected for the defect inspection.

SUMMARY OF THE INVENTION

The present invention has been made in view of the above circumstances. An object of the present invention is to provide a surface inspection device and a surface inspection method. In the device and method, a defect inspection throughout a surface of a sample such as a wafer can be effectively performed, and information acquired by the defect inspection can be effectively used in a manufacturing process.

To accomplish the above object, according to one aspect of the present invention, there is provided a surface inspection device for performing an inspection of a sample surface. The surface inspection device comprises a unit which, when coordinates are set in an area from a center to a vicinity of an outer edge in the sample surface, stores inspection results of the area in relation to the coordinates in a position where the inspection results are acquired.

To accomplish the above object, according to another aspect of the present invention, there is provided a surface inspection method for performing an inspection of a sample surface. The surface inspection method comprises the steps of setting coordinates in an area from a center to a vicinity of an outer edge in the sample surface, and storing inspection results of the area in relation to the coordinates in a position where the inspection results are acquired.

The above and other objects, features and advantages of the present invention will become apparent from the following

DESCRIPTION OF THE PREFERRED EMBODIMENTS

Figure 1:
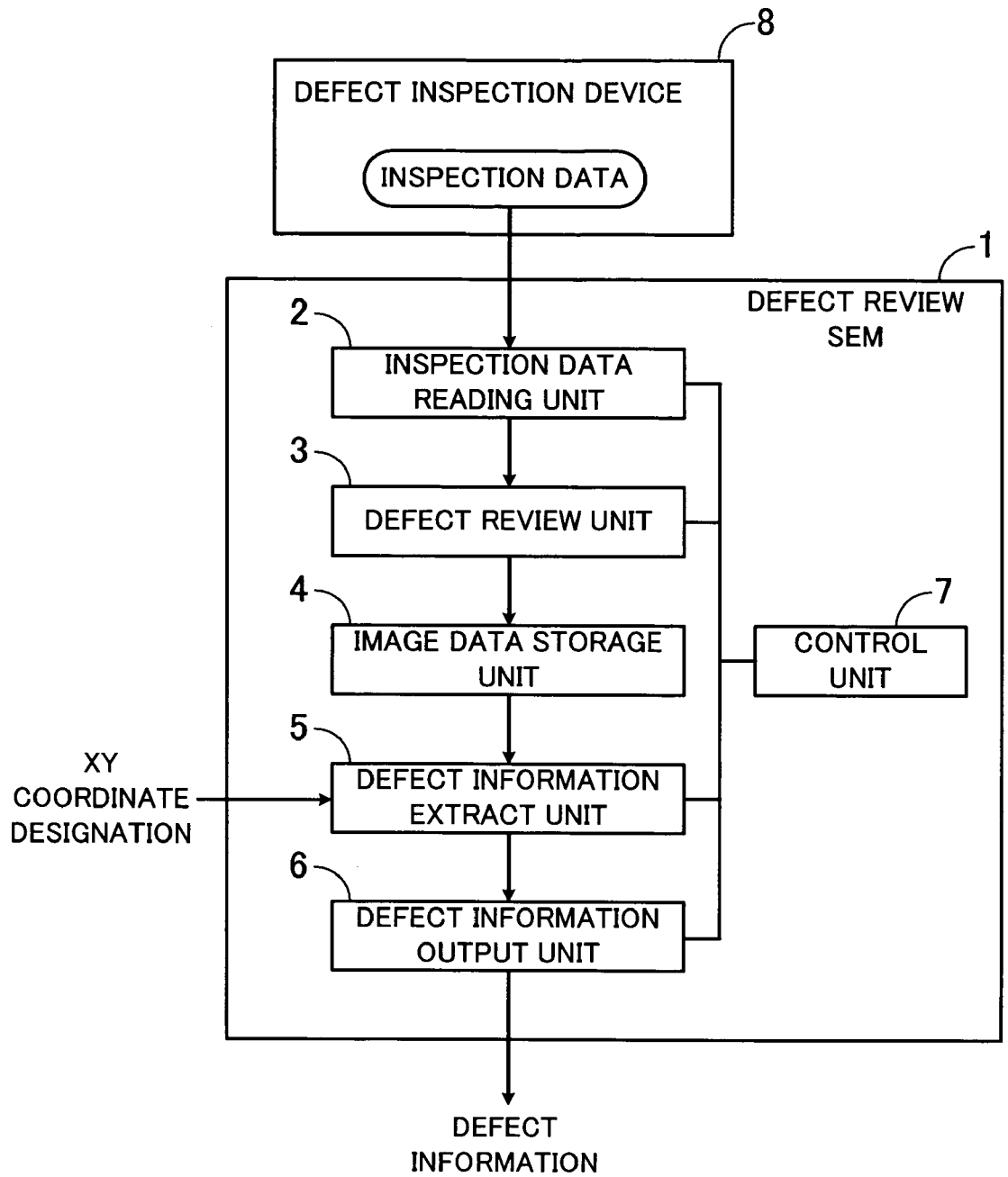
FIG. 1 is a functional block diagram of a defect review SEM.

Using, as an example, a case where preferred embodiments of the present invention are applied to defect inspection of a semiconductor wafer using a defect inspection device and a defect review SEM, preferred embodiments of the present invention will be described in detail below with reference to the accompanying drawings, wherein like reference numerals refer to like elements throughout.

FIG. 1 is a functional block diagram of a defect review SEM.

The defect review SEM 1 shown in FIG. 1 has an inspection data reading unit 2, a defect review unit 3, an image data storage unit 4, a defect information extract unit 5, a defect information output unit 6 and a control unit 7 which controls these units. That kind of the defect review SEM 1 can be configured, for example, by combining a SEM and a computer.

The inspection data reading unit 2 reads inspection data of a defect inspection device 8 such as an appearance inspection device or a laser type surface foreign matter inspection device into the defect review SEM 1. The inspection data include, for example, the number, coordinates, size of defective spots on the wafer to be inspected, in addition to product number, lot, ID of wafer to be inspected, process inspection device and date.

Using the inspection data read by the inspection data reading unit 2, the defect review unit 3 performs a defect review by the SEM. For example, the unit 3 performs a review of the defective spot, which is indicated by the coordinates, based on the coordinates of the defective spots included in the inspection data and creates the SEM image data of the defective spot as the inspection results.

The image data storage unit 4 stores as defect information the SEM image data created by the defect review unit 3, in relation to the inspection data used for the creation. At this time, data are added, if desired. The image data storage unit 4 is, for example, a storage device such as a Hard Disk Drive (HDD) housed in the defect review SEM 1, or an external storage device.

The defect information extract unit 5 is one which, when an output command on specific defect information is inputted, extracts the relevant defect information out of the defect information including the SEM image data or the inspection data from the image data storage unit 4.

The defect information output unit 6 outputs the defect information extracted by the defect information extract unit 5 on a display unit such as a monitor.

The defect review SEM 1 with this configuration has software that cooperates therewith so as to execute predetermined defect detection according to algorithm that the software has. In the defect review SEM 1 and a defect inspection device 8 that feeds inspection data to the SEM 1, coordinates are set throughout the area excluding a round end face of an outer edge of a wafer to be inspected.

Figure 2:
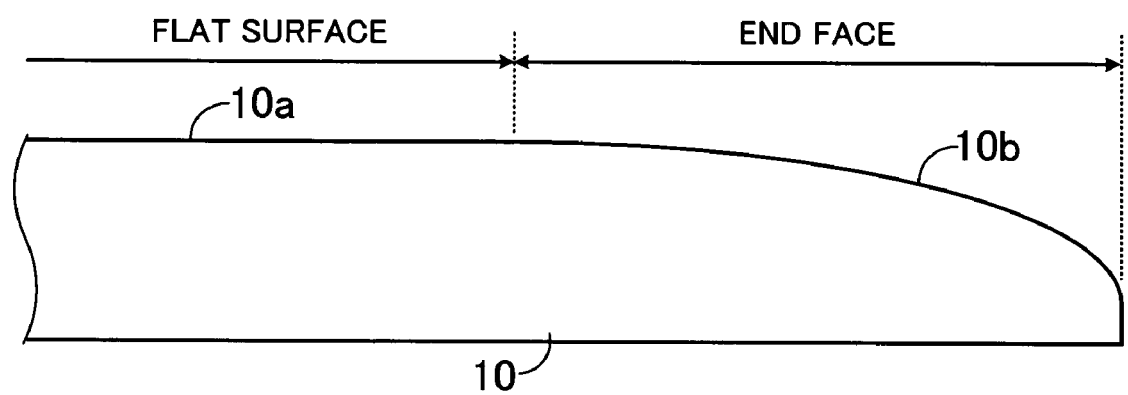
FIG. 2 is a schematic sectional view of an outer edge of a wafer.

Herein, as shown in a schematic sectional view of an outer edge of a wafer in FIG. 2, the round end face means an end face 10b in which a flat surface 10a from the center of a wafer 10 is curved near the outer edge. The round end face is formed in the production of the wafer 10. On this round end face 10b, a pattern, particularly a pattern which is used as a product is not formed.

When the coordinates are set throughout the area excluding this round end face of the wafer to be inspected, for example, the inspection data not only of the effective chip area but also of the area other than the effective chip area are acquired to allow execution of the defect review.

The defect detection is described below by referring to a product wafer and a blank wafer. The product wafer means a wafer having formed thereon a chip (including also one in process of formation) for using as a product. The blank wafer means a wafer having formed thereon no chip, which is used for the sake of managing devices or processes.

Figure 3:
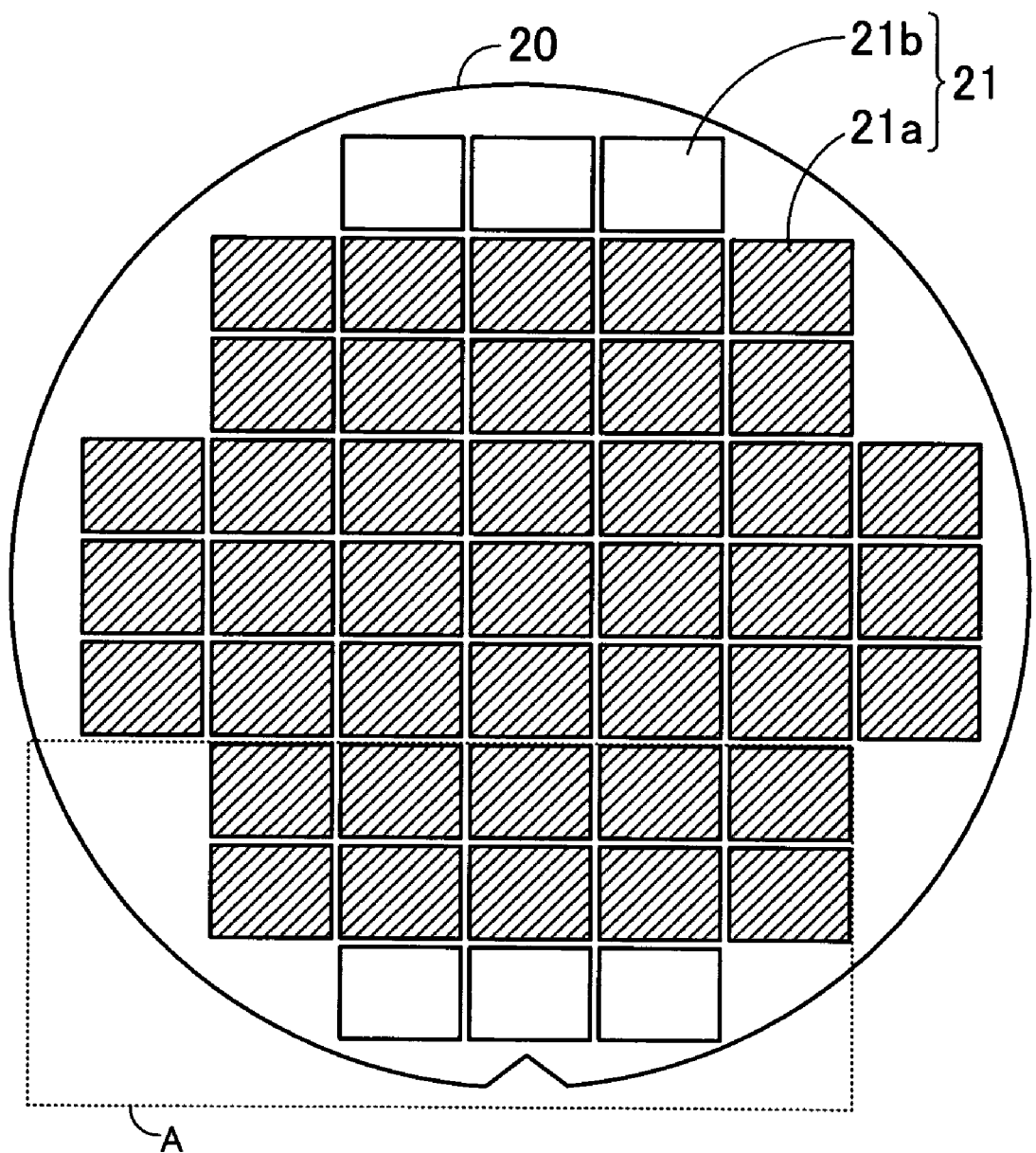
FIG. 3 is a schematic plan view of an entire product wafer.
Figure 4:
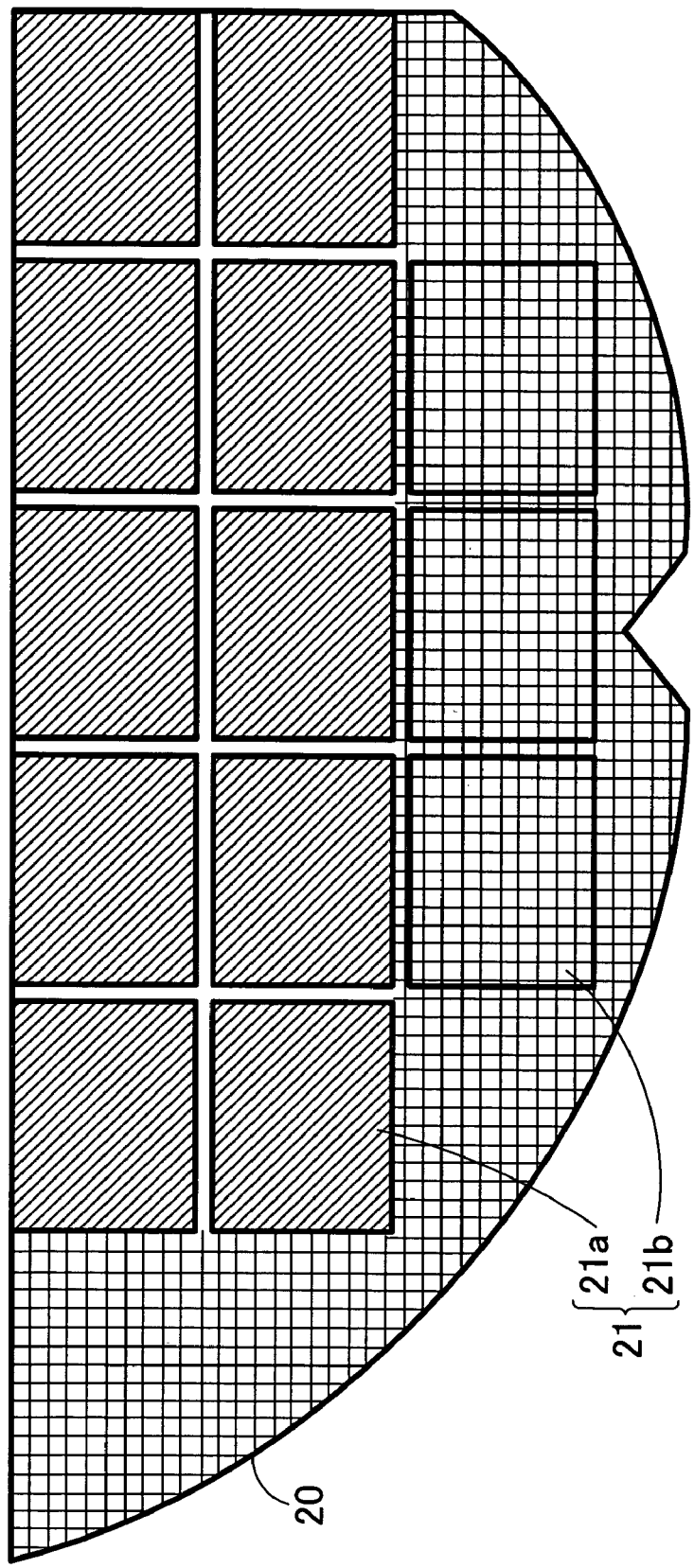
FIG. 4 is a schematic plan view showing an essential part of a product wafer.
Figure 5:
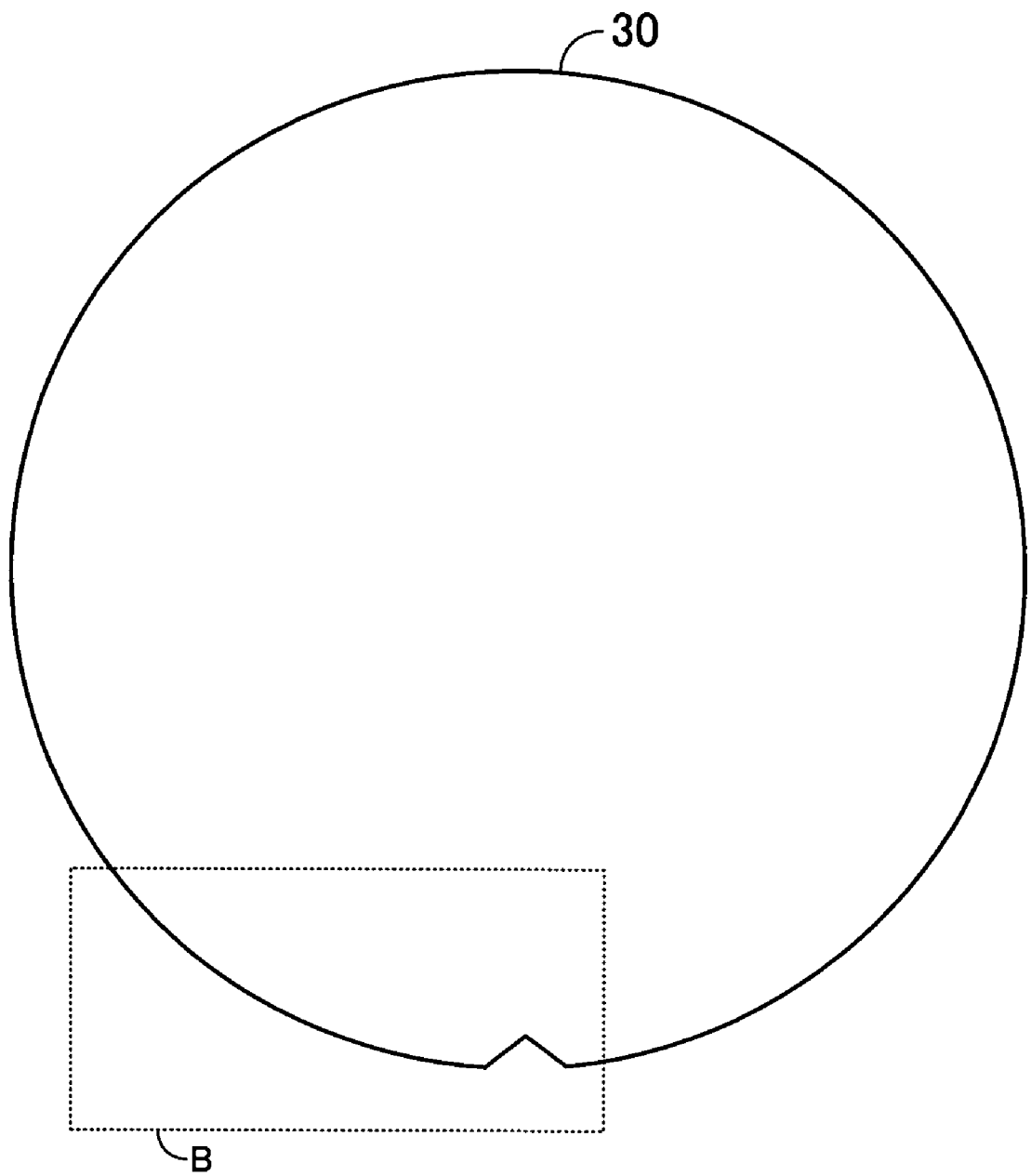
FIG. 5 is a schematic plan view of an entire blank wafer.
Figure 6:
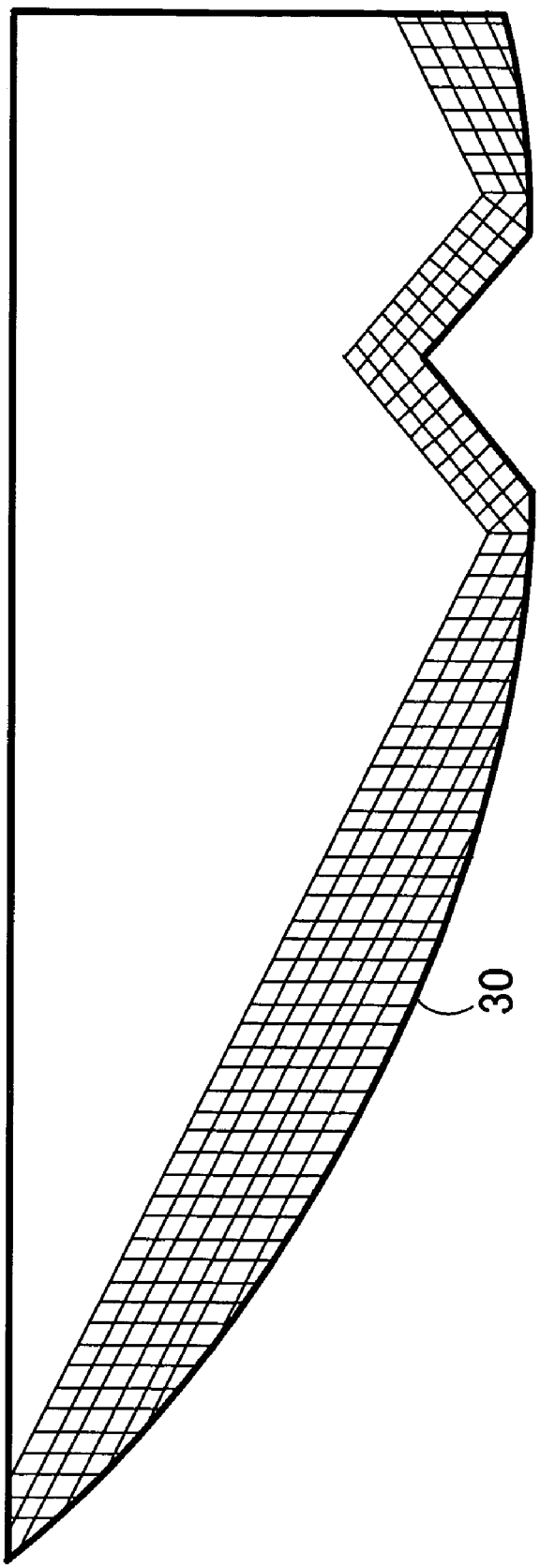
FIG. 6 is a schematic plan view showing an essential part of a blank wafer.

FIG. 3 is a schematic plan view of an entire product wafer. FIG. 4 is a schematic plan view showing an essential part of a product wafer. FIG. 5 is a schematic plan view of an entire blank wafer. FIG. 6 is a schematic plan view showing an essential part of a blank wafer. FIG. 4 is an enlarged view of "A" part in FIG. 3. FIG. 6 is an enlarged view of "B" part in FIG. 5. In FIGS. 3 to 6, a round end face of the outer edge of the wafer is not shown. In FIGS. 3 to 5, a coordinate system is not shown.

The product wafer 20 shown in FIGS. 3 and 4 has a surface on which a large number of chips 21 are arranged in a matrix in a plane. In a formation area of these chips 21, a formation area of chips 21a disposed in the central part of the product wafer 20 is an effective chip area. This area is heretofore an inspection area. On the contrary, a formation area of only three chips 21b laterally disposed close to the formation area of the chips 21a is heretofore a non-inspection area. This is because that when performing the inspection according to a conventional algorithm, four or more chips must be disposed laterally. In addition, an area (an area in which the chips 21 are not formed) other than the formation area of these chips 21 also is heretofore a non-inspection area. Therefore, as shown in FIG. 4, the area other than the effective chip area is divided vertically and horizontally, for example, at intervals of 0.1 to 2.0 μm, preferably 0.5 to 1.0 μm. Then, an origin is properly provided for setting the X-Y coordinate system in the area (not shown in FIG. 3).

In a blank wafer 30 shown in FIGS. 5 and 6, depending on the range of an edge cut, an area extending from the outer edge to the inner side by a distance of about 3 mm is generally a non-inspection area where a conventional inspection cannot be performed. Therefore, as shown in FIG. 6, this non-inspection area is divided vertically and horizontally, for example, at intervals of 0.1 to 2.0 μm, preferably 0.5 to 1.0 μm. Then, an origin is properly provided for setting the X-Y coordinate system in the area (not shown in FIG. 5).

After the setting of the X-Y coordinate system as described above, the defect review SEM 1 performs the defect detection. At the defect detection, the position of the X-Y coordinates of the defective spot on the product wafer 20 or on the blank wafer 30 corresponding to the X-Y coordinates of the defective spot in the defect inspection device 8 is determined.

Specifically, for example, X-Y coordinates of several points on the product wafer 20 or on the blank wafer 30 are previously selected. When the defect detection is performed by the defect review SEM 1 using inspection data of the defect inspection device 8, alignment at the selection point is performed between the defect inspection device 8 and the defect review SEM 1. By doing so, the correlation in the X-Y coordinates between both of the devices is grasped. As a result, the X-Y coordinates in the defect review SEM 1 of the defective spot on the product wafer 20 or on the blank wafer 30 can be acquired from the inspection data of the defect inspection device 8. Finally, the SEM image data of the defective spot can be acquired.

In the X-Y coordinate system, for example, a quadrangle (referred to as a "die") that the product wafer 20 or the blank wafer 30 touches internally is set and any one of vertexes can be used as the origin.

Figure 7:
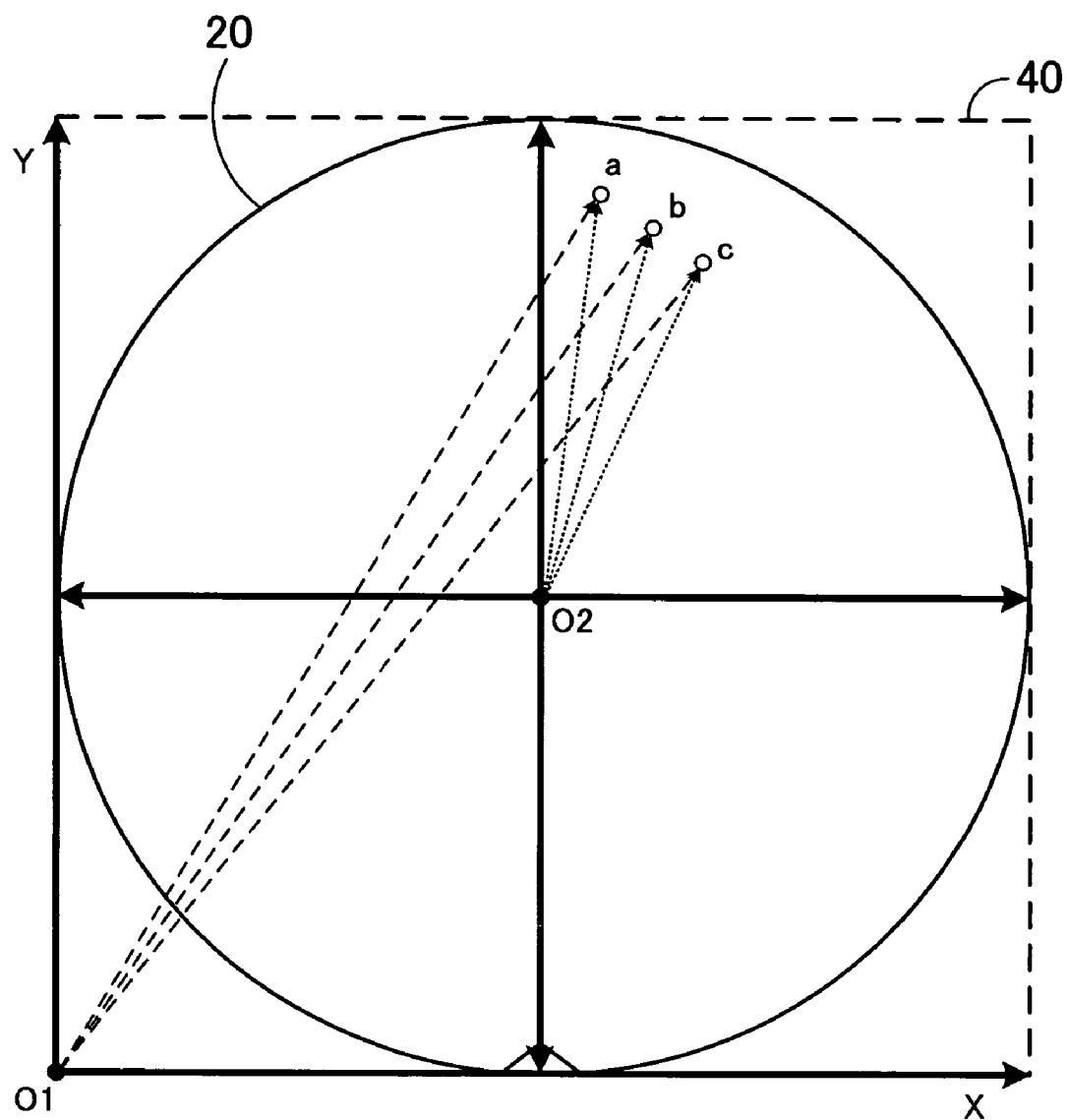
FIG. 7 illustrates a coordinate origin.

FIG. 7 illustrates the origin of the coordinate system.

For example, a die 40 that surrounds the product wafer 20 is set and one of vertexes is used as the origin O1. In the alignment, the defect review SEM 1 determines the X-Y coordinates of the defective spots to the origin O1 in the effective chip area or in the area other than the area where the X-Y coordinate system is newly set. When the inspection data of the defect inspection device 8 include, for example, the defective spots within the effective chip area, the defect review SEM 1 performs the defect detection in the customary way as follows. The SEM 1 finds positions within the die 40 of the defective spots from the inspection data and reviews each defective spot to acquire the SEM image data. On the other hand, as shown in FIG. 7, when the inspection data includes, for example, defective spots "a", "b" and "c" within the area where the X-Y coordinate system is newly set, the SEM 1 performs the defect detection as follows. The SEM 1 acquires positions within the die 40 of the defective spots "a", "b" and "c" from the inspection data and reviews each defective spot to acquire the SEM image data.

Further, the defect inspection device 8 and the defect review SEM 1 perform the defect detection as follows. Apart from the origin O1, the center of the product wafer 20 is used as a second origin O2. X-Y coordinates of each defective spot to the origin O2 are determined to find positions on the wafer of each defective spot. The X-Y coordinates of the positions acquired at this time are each added to the relevant inspection data when the defect review SEM 1 acquires the SEM image data. The inspection data are stored in relation to the SEM image data.

In FIG. 7, the present invention is described by referring to the product wafer 20. The same is equally true of the blank wafer 30.

Subsequently, a flow of the defect detection using the defect inspection device 8 and the defect review SEM 1 is described.

Figure 8:
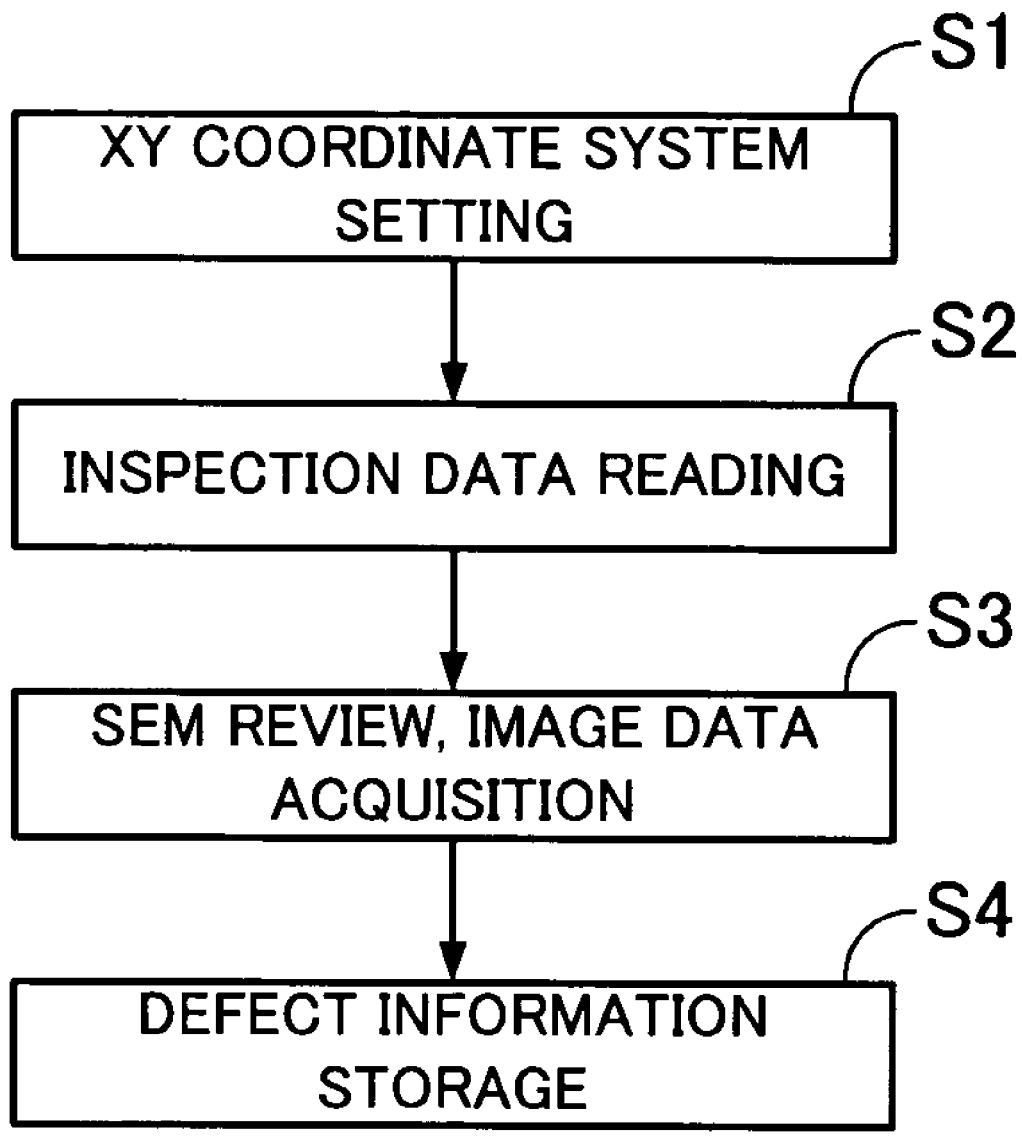
FIG. 8 is a flow chart of defect inspection in a defect review SEM.

FIG. 8 is a flow chart of the defect inspection in the defect review SEM.

For example, the defect detection of various wafers to be inspected such as the product wafer 20 or blank wafer 30 is performed as follows. At first, in the defect detection device 8 and the defect review SEM 1, the X-Y coordinate system is set in the effective chip area using O1 and O2 as the origins. Simultaneously, an area (excluding a round end face) other than the effective chip area is divided into the X and Y directions at predetermined intervals, and the X-Y coordinate system is set also in this area using O1 and O2 as the origins (step S1).

In the SEM 1, the inspection data reading unit 2 reads the inspection data acquired by the device 8 (step S2). The defect review unit 3 performs a review of a position of a defective spot corresponding to the defective spot included in the inspection data and acquires the SEM image data of the defective spot as the inspection results (step S3).

At this time, the unit 3 finds a position within the die 40 of the defective spot using the X-Y coordinates to the origin O1 and acquires the SEM image data. Simultaneously, the unit 3 determines the X-Y coordinates of the defective spot to the origin O2 and finds the position of the defective spot on the wafer to be inspected. When a plurality of defective spots are present, the unit 3 travels through each defective spot based on the X-Y coordinates within the die 40 and acquires the SEM image data and X-Y coordinates on the wafer to be inspected of each defective spot.

The image data storage unit 4 stores, as defect information, the SEM image data acquired by the unit 3, in relation to the inspection data including the X-Y coordinates on the wafer to be inspected (step S4).

The defect information of the wafer to be inspected, which is stored by the unit 4, is displayed as follows. For example, when an operator designates the X-Y coordinates, the defect information extract unit 5 extracts the relevant defect information. Then, the defect information output unit 6 displays the defect information on a monitor. In addition, without the designation of particular X-Y coordinates, the unit 6 may be allowed to display a distribution of the defective spots that are present throughout a surface of the wafer to be inspected, as a result of the defect detection.

As described above, the SEM 1 stores and accumulates the defect information of each defective spot. Therefore, for example, the SEM 1 performs the defect detection of the wafer at each step in the production of the semiconductor device and facilitates a Defect Source Analysis (DSA) processing analysis using the accumulated data. More specifically, according to the DSA processing analysis, the X-Y coordinates of the defective spots on the wafer at each step are collated using the acquired defect information of the wafer at each step. As a result, it can be understood that in the defect at the same X-Y coordinates, a step where the defect is first detected is a generation step of the defect. A concrete method of the DSA processing analysis is described later. Further, a Focused Ion Beam (FIB) cross-section analysis also can be readily performed using the X-Y coordinates, which are acquired from the defect information accumulated, of the defective spots on the wafer to be inspected.

The X-Y coordinate system at the step S1 is set in the X and Y directions, for example, at intervals of 0.1 to 2.0 µm as described above. The reasons are as follows. In the case where the coordinate interval is smaller than 0.1 µm, there is a possibility that huge volumes of data are generated by the defect detection. Particularly, when a defect with a size larger than the interval is present in a relatively small area, a large number of inspection results are acquired for the defect that is considered as substantially one defect. On the contrary, in the case where the coordinate interval is larger than 2.0 µm, even if a defect is actually present, the defect cannot be detected. Therefore, it is feared that the accuracy of defect detection is reduced. However, as the X-Y coordinate interval is smaller, the accuracy of defect detection can be more improved, if restrictions in the amount of data are eliminated. The coordinate interval can be properly set in view of the above-described points as well as specifications including a chip size on the wafer.

As described above, according to the device 8 and the SEM 1, the defect inspection can be performed throughout the area excluding a round end face on the surface of the wafer to be inspected. That is, the defect inspection can be performed not only on the chip 21a which can be used as a product but also on other chip 21b or on the area other than the chip 21 formation area. As a result, the chip 21a used as a product, which is formed in the effective chip area, can be improved in the quality. Further, a defect source capable of being present in the area other than the effective chip area can be traced. In addition, this trace results can be reflected in the condition setting of the manufacturing process.

Herein, the DSA processing analysis method is concretely described by referring to Dual Damascene Process.

Figure 9:
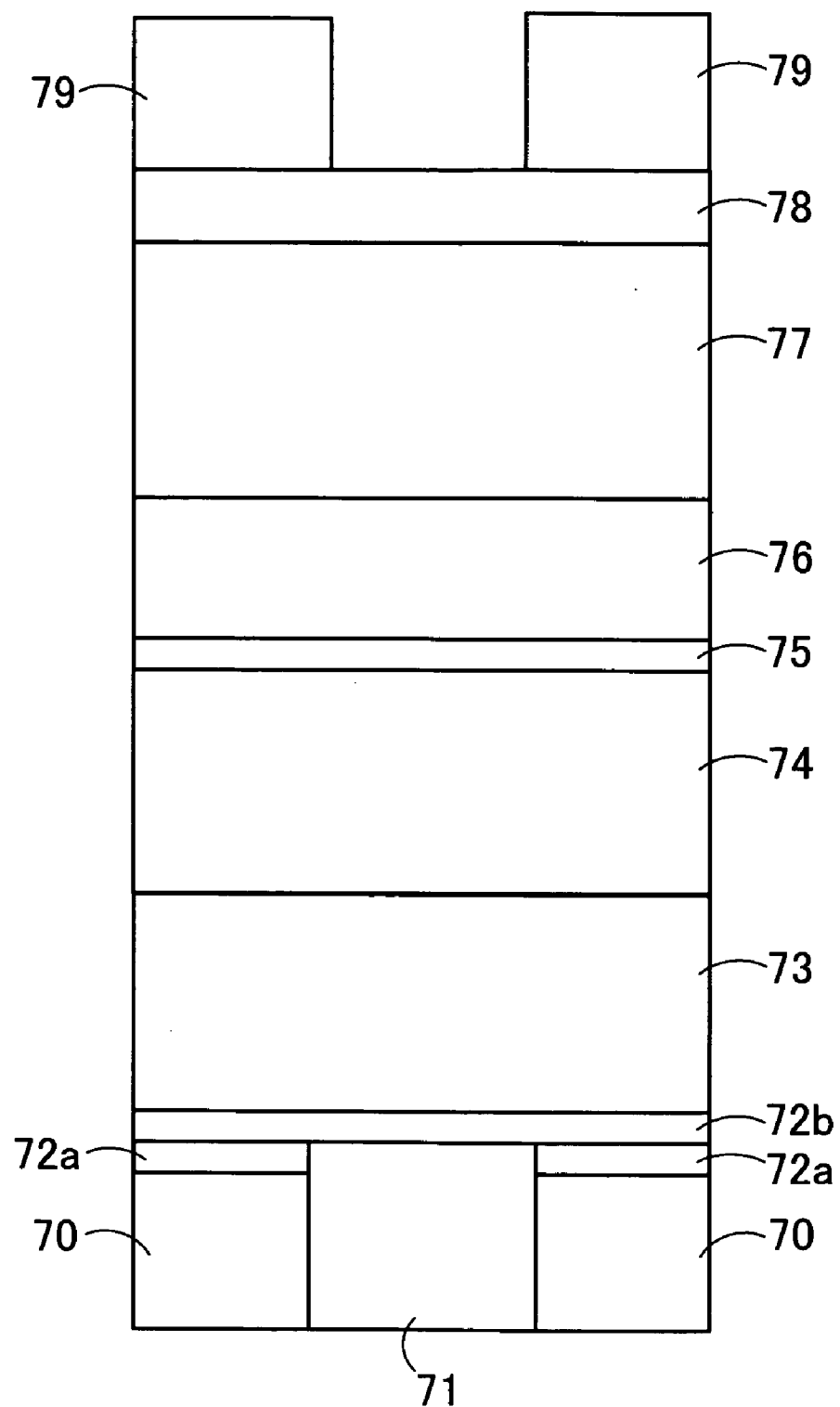
FIG. 9 is a schematic sectional view of a lithography step for via.
Figure 10:
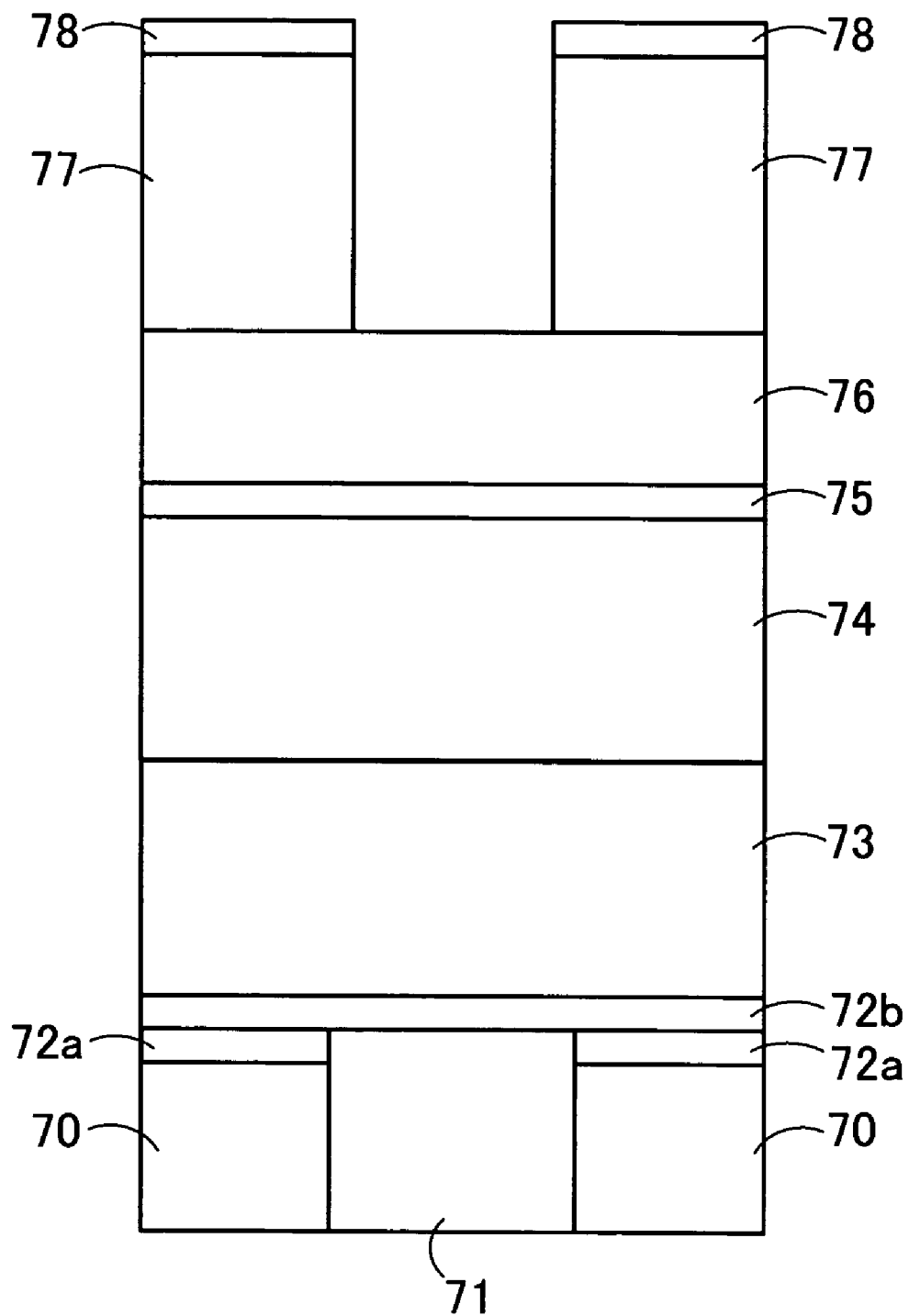
FIG. 10 is a schematic sectional view of a resist pattern formation step for via.
Figure 11:
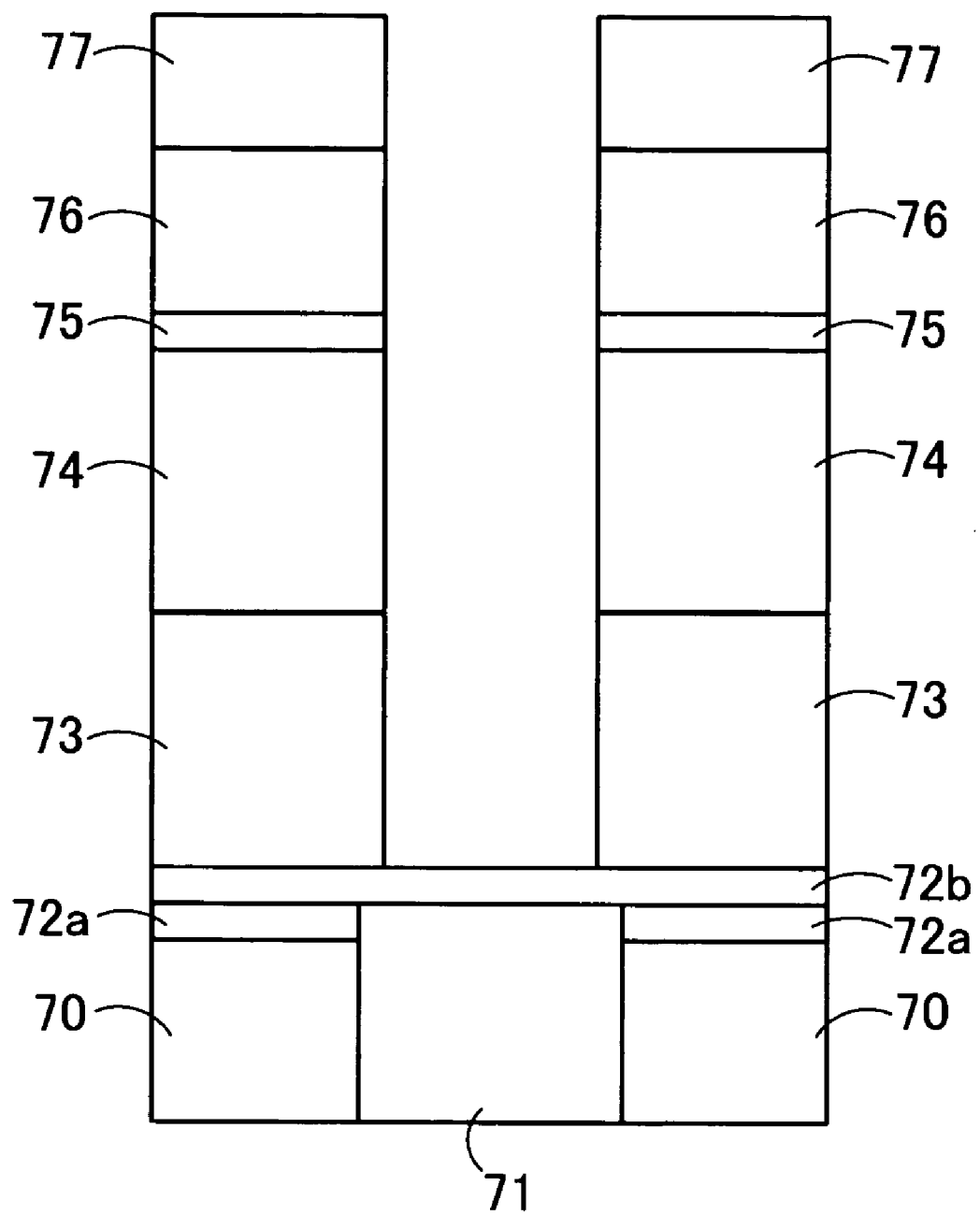
FIG. 11 is a schematic sectional view of a via etching step.
Figure 12:
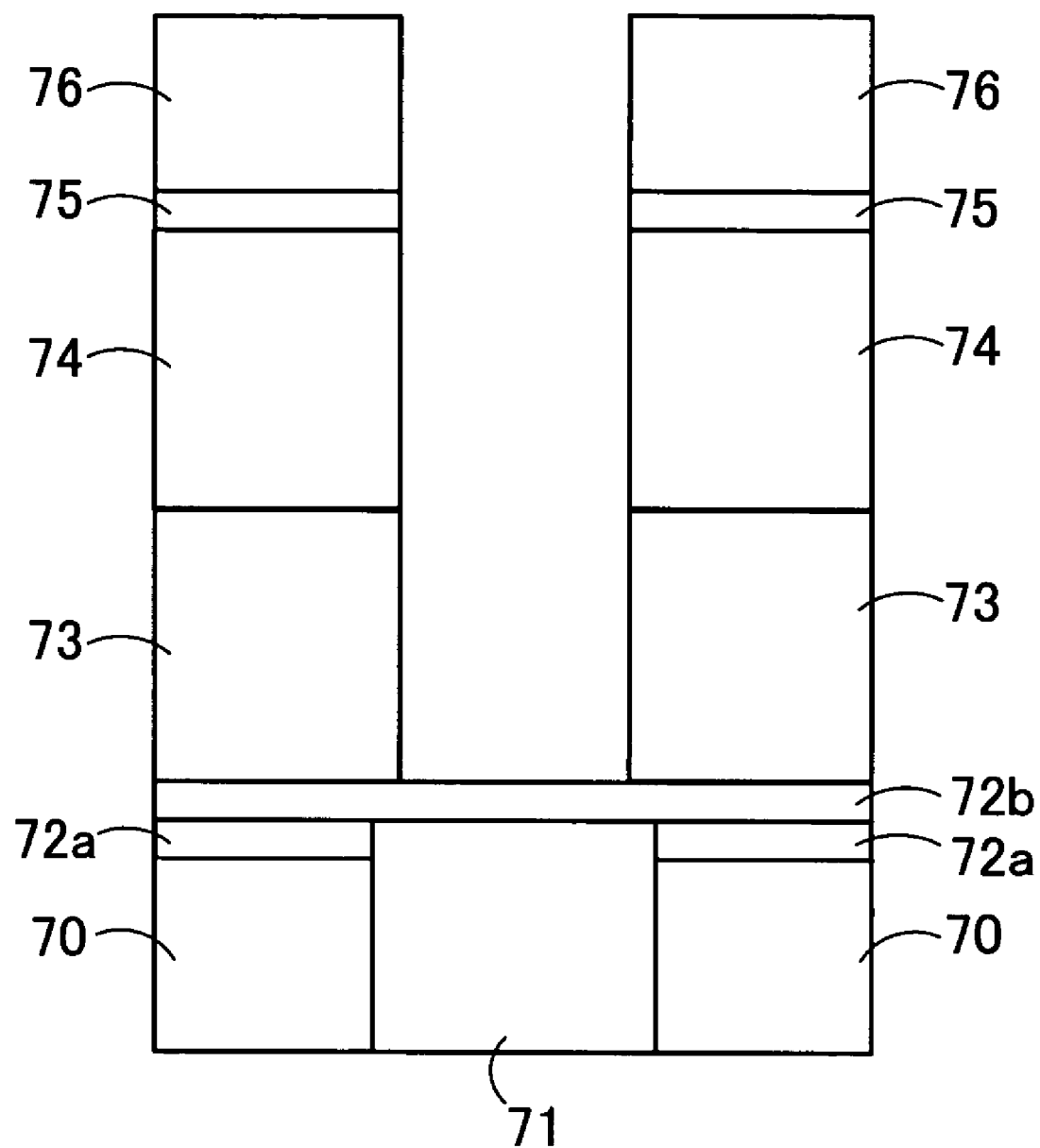
FIG. 12 is a schematic sectional view of a first ashing step.
Figure 13:
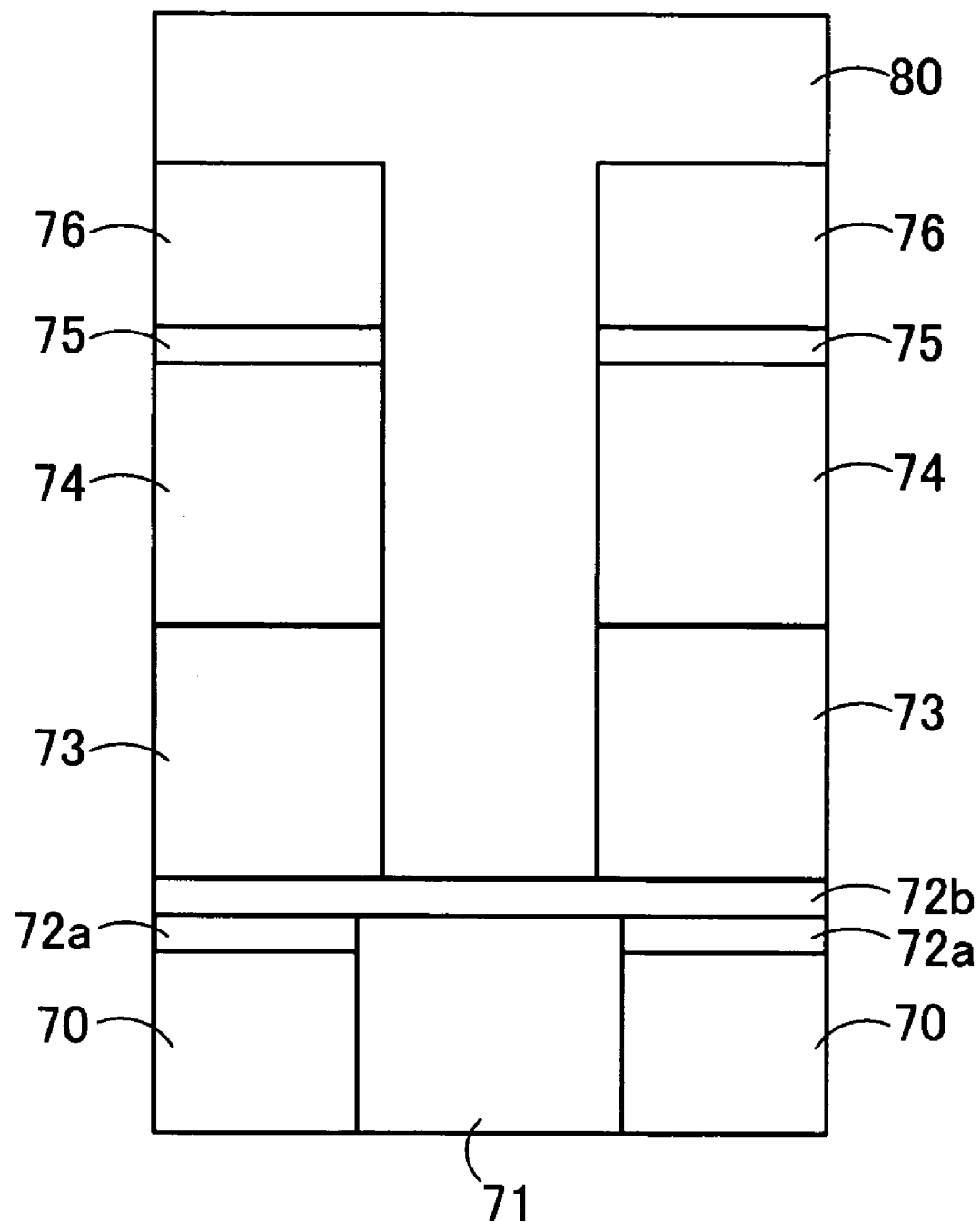
FIG. 13 is a schematic sectional view of a resist coating step.
Figure 14:
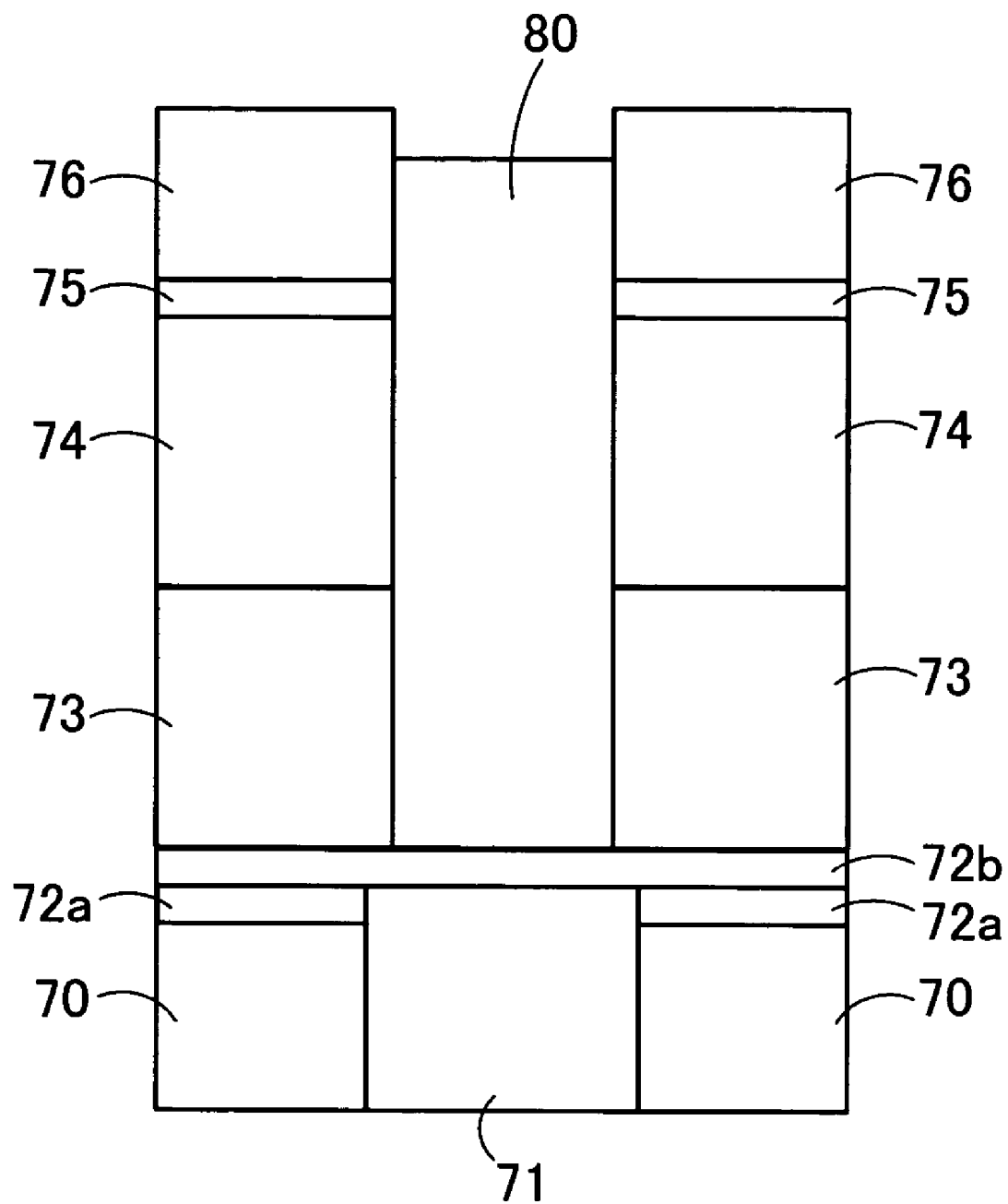
FIG. 14 is a schematic sectional view of a resist etch back step.
Figure 15:
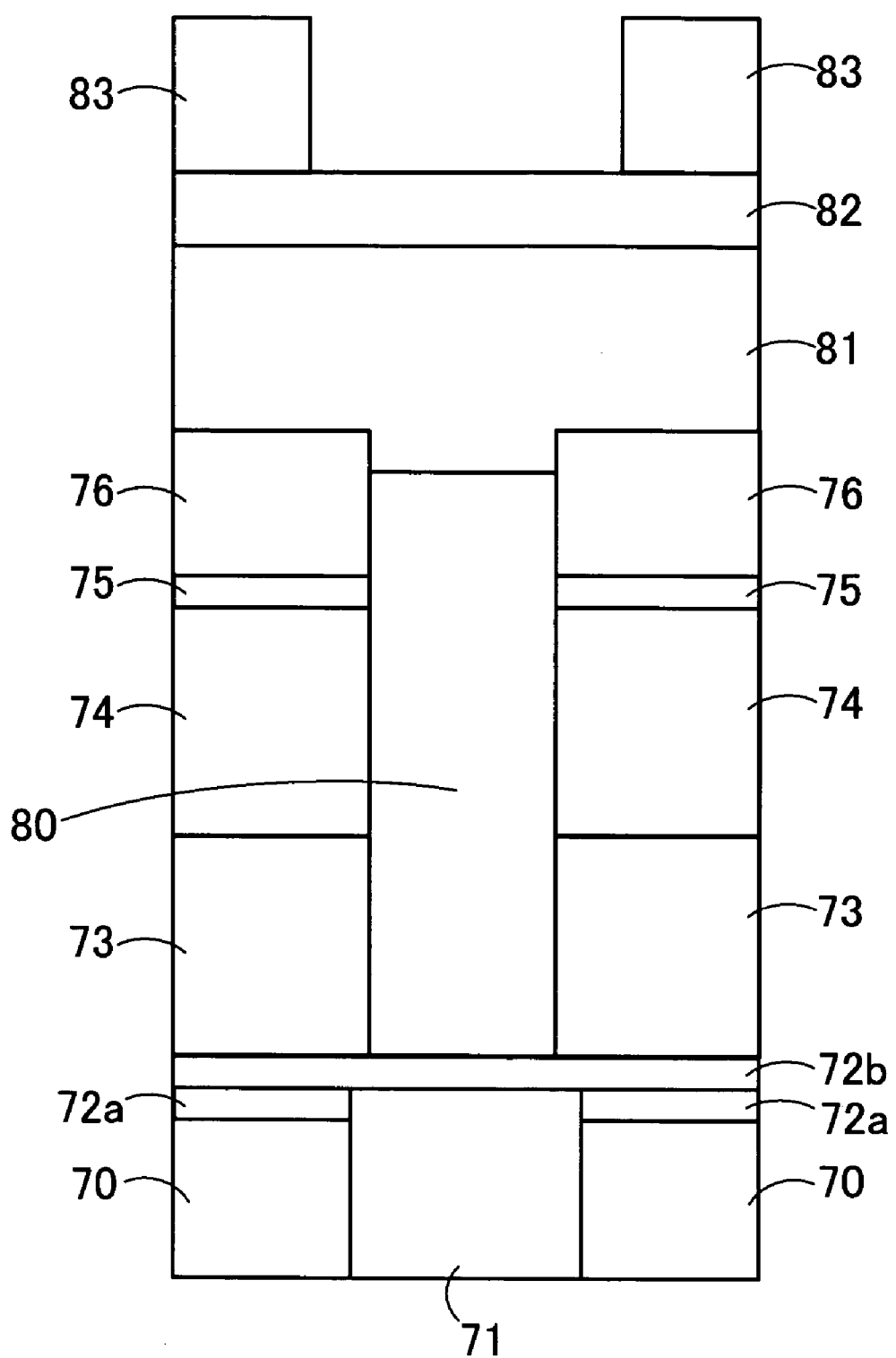
FIG. 15 is a schematic sectional view of a lithography step for trench.
Figure 16:
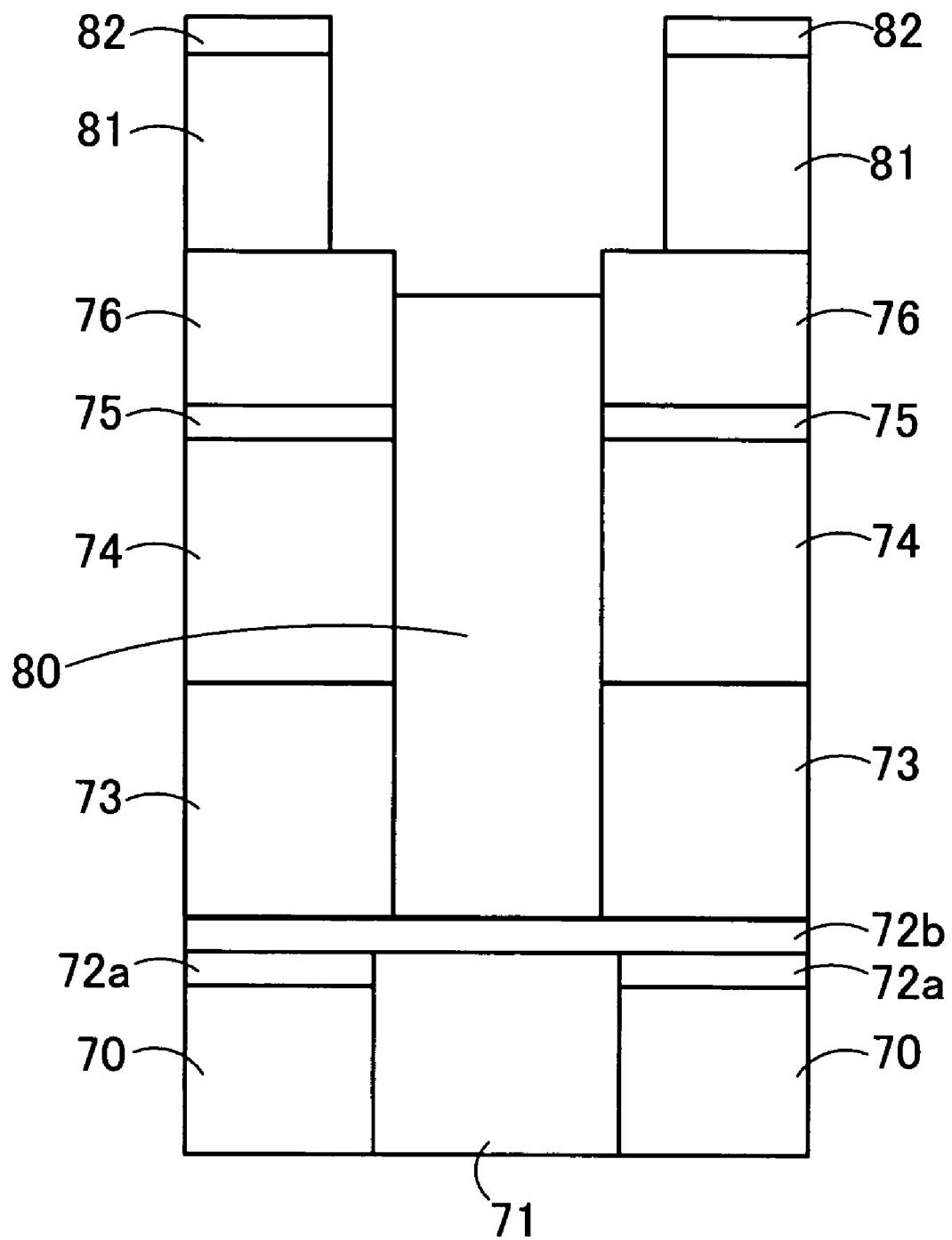
FIG. 16 is a schematic sectional view of a resist pattern formation step for trench.
Figure 17:
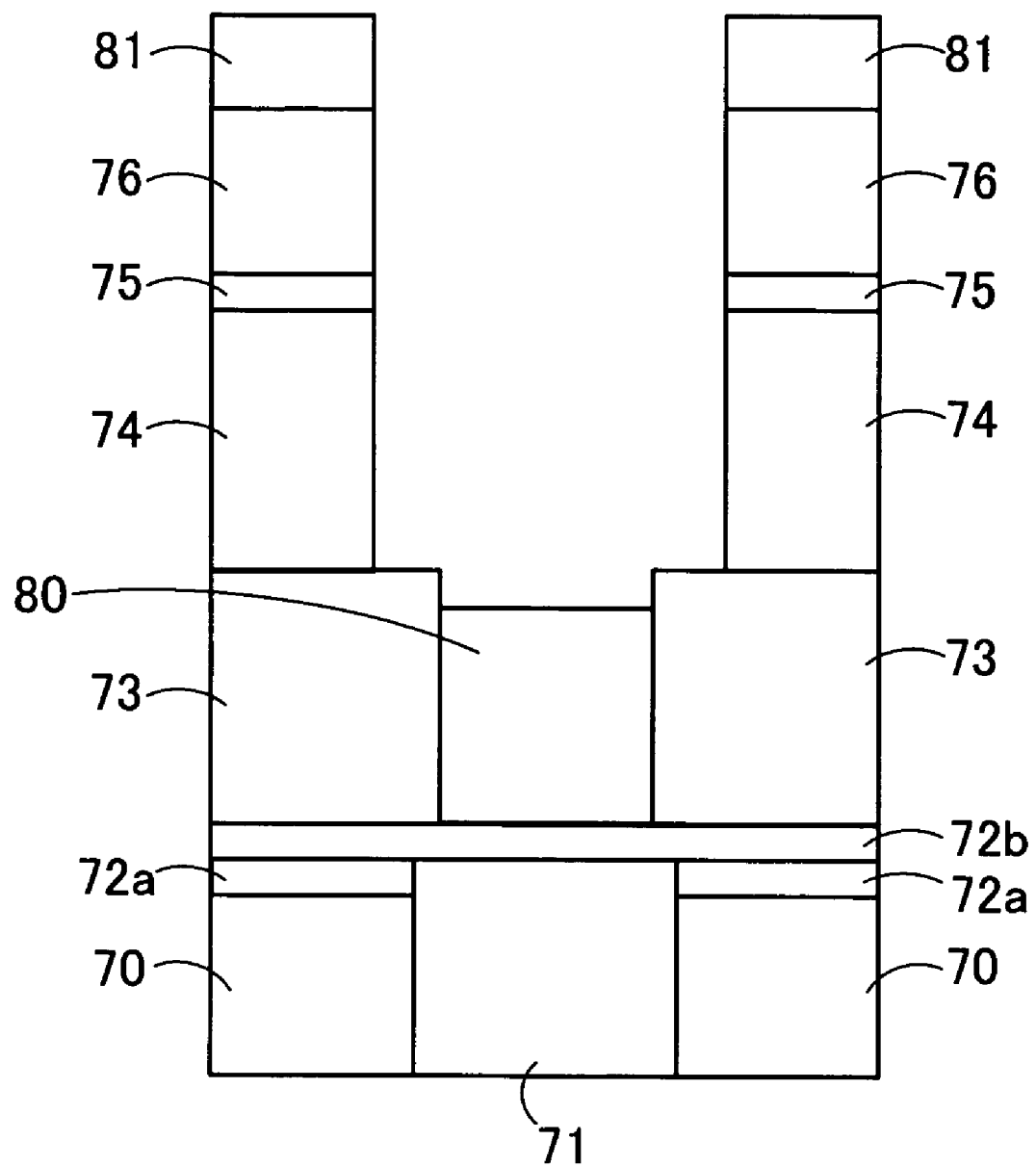
FIG. 17 is a schematic sectional view of a trenching etching step.
Figure 18:
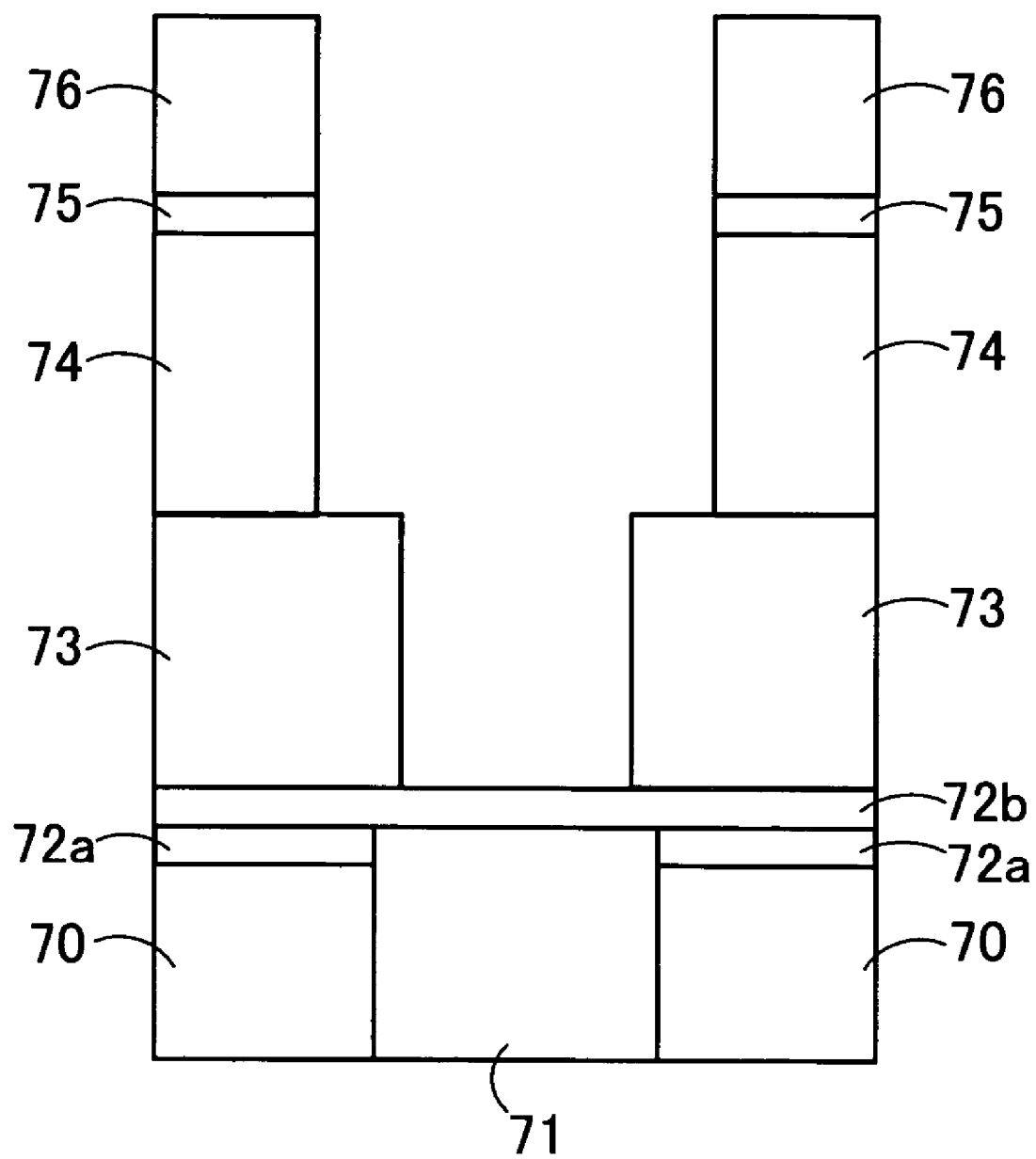
FIG. 18 is a schematic sectional view of a second ashing step.
Figure 19:
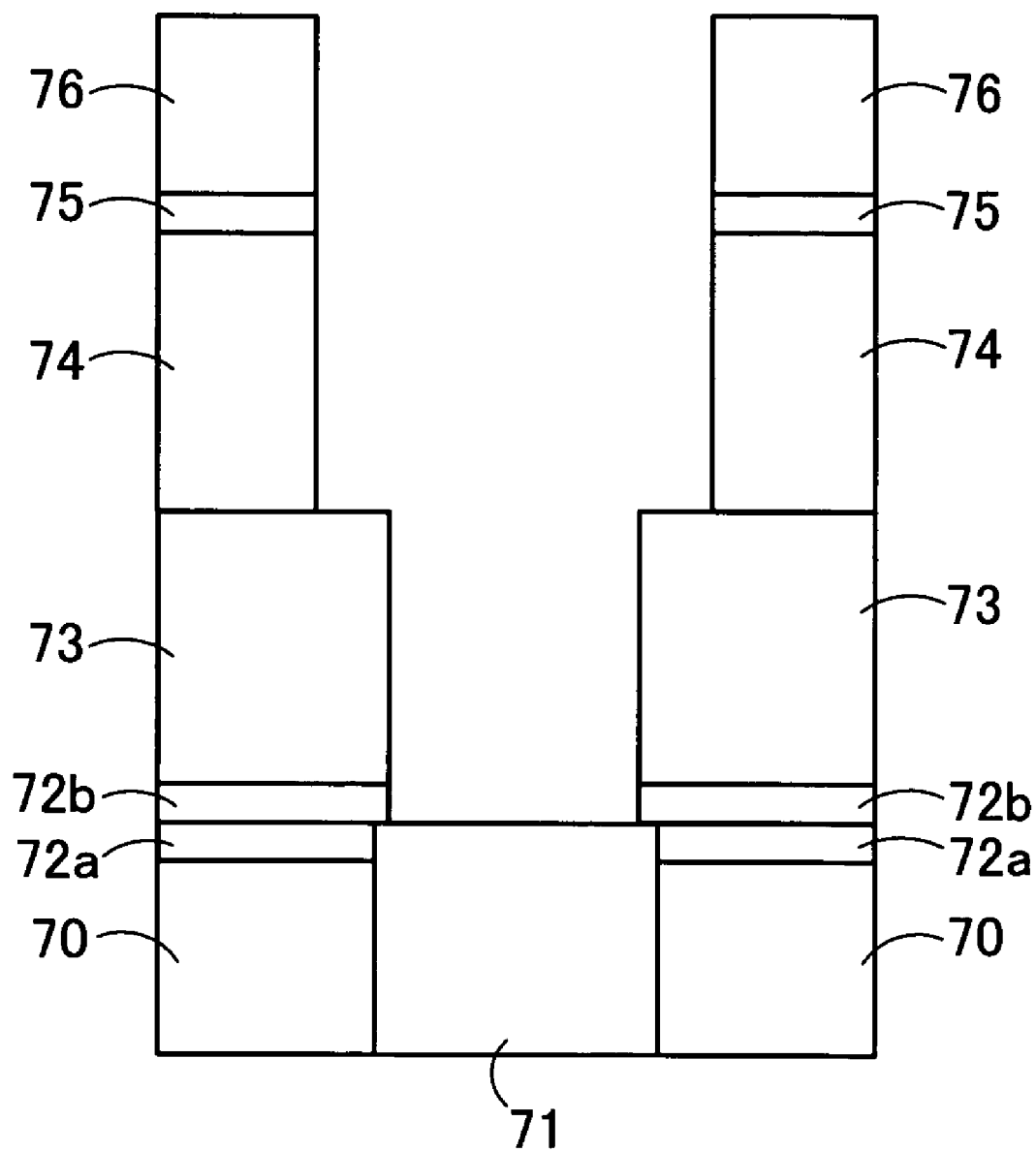
FIG. 19 is a schematic sectional view of a barrier layer etching step.

At first, a flow of the Dual Damascene Process is simply described. FIGS. 9 to 19 illustrate the Dual Damascene Process. FIG. 9 is a schematic sectional view of a lithography step for via. FIG. 10 is a schematic sectional view of a resist pattern formation step for via. FIG. 11 is a schematic sectional view of a via etching step. FIG. 12 is a schematic sectional view of a first ashing step. FIG. 13 is a schematic sectional view of a resist coating step. FIG. 14 is a schematic sectional view of a resist etch back step. FIG. 15 is a schematic sectional view of a lithography step for trench. FIG. 16 is a schematic sectional view of a resist pattern formation step for trench. FIG. 17 is a schematic sectional view of a trench etching step. FIG. 18 is a schematic sectional view of a second ashing step, and FIG. 19 is a schematic sectional view of a barrier layer etching step.

In the example, as shown in FIG. 9, silicon carbide (SiC) films 72a and 72b, low permittivity films (Low-k film) 73 and 74, a SiC film 75 and a SiO$_2$ film 76, which serve as a barrier layer, are sequentially laminated on the lower layer Cu wiring 71 formed within the insulating film 70 such as a low permittivity (Low-k) film. Further thereon, a resist film 77, a Spin On Glass (SOG) film 78 and an argon fluoride (ArF) resist film 79 are sequentially formed. FIG. 9 shows a state in which the processing is performed up to patterning of the ArF resist film 79. The defect inspection (I) within the effective chip area is performed during the processing up to a state as shown in FIG. 9, typically, after the formation of the Low-k films 73 and 74.

After the patterning of the ArF resist film 79, as shown in FIG. 10, etching of the SOG film 78 and the resist film 77 is performed to form a resist pattern for forming a via that connects the lower layer Cu wiring 71 with the upper layer Cu wiring. Using the pattern as a mask, the etching is further performed till the lower layer SiC film 72b is exposed, and thereby acquiring a state where the via is formed as shown in FIG. 11. The defect inspection (II) within the effective chip area is generally performed after finishing the processing up to a state shown in FIG. 11.

After formation of the via, the remaining resist film 77 or residues thereof are removed by ashing as shown in FIG. 12. As shown in FIGS. 13 and 14, a resist film 80 that fills the via is then formed, and a portion of the surface side of the film 80 is etched back and removed. Thereafter, as shown in FIG. 15, a resist film 81, an SOG film 82 and an ArF resist film 83 are sequentially formed thereon again to form a resist pattern for forming a trench in which the upper layer Cu wiring is filled as shown in FIG. 16. Using the pattern as a mask, the etching of the upper layer Low-k film 74 is then performed as shown in FIG. 17. Typically, the defect inspection (III) within the effective chip area is performed after finishing the processing up to a state shown in FIG. 17.

Subsequently, the remaining resist films 80 and 81 or residues thereof are removed by ashing as shown in FIG. 18. Typically, the defect inspection (IV) within the effective chip area is performed also after the ashing. The lower layer SiC film 72b is then removed by etching as shown in FIG. 19.

Thereafter, Cu is filled within the via and the trench through each step such as deposition of Cu and CMP although the steps are not shown in the drawings. As a result, a wiring structure is formed where the lower layer Cu wiring 71 and the upper layer Cu wiring are connected through the via.

The DSA processing analysis is performed using the results of respective defect inspections (I) to (IV) of the effective chip area, which are carried out during this series of processes.

Figure 20:
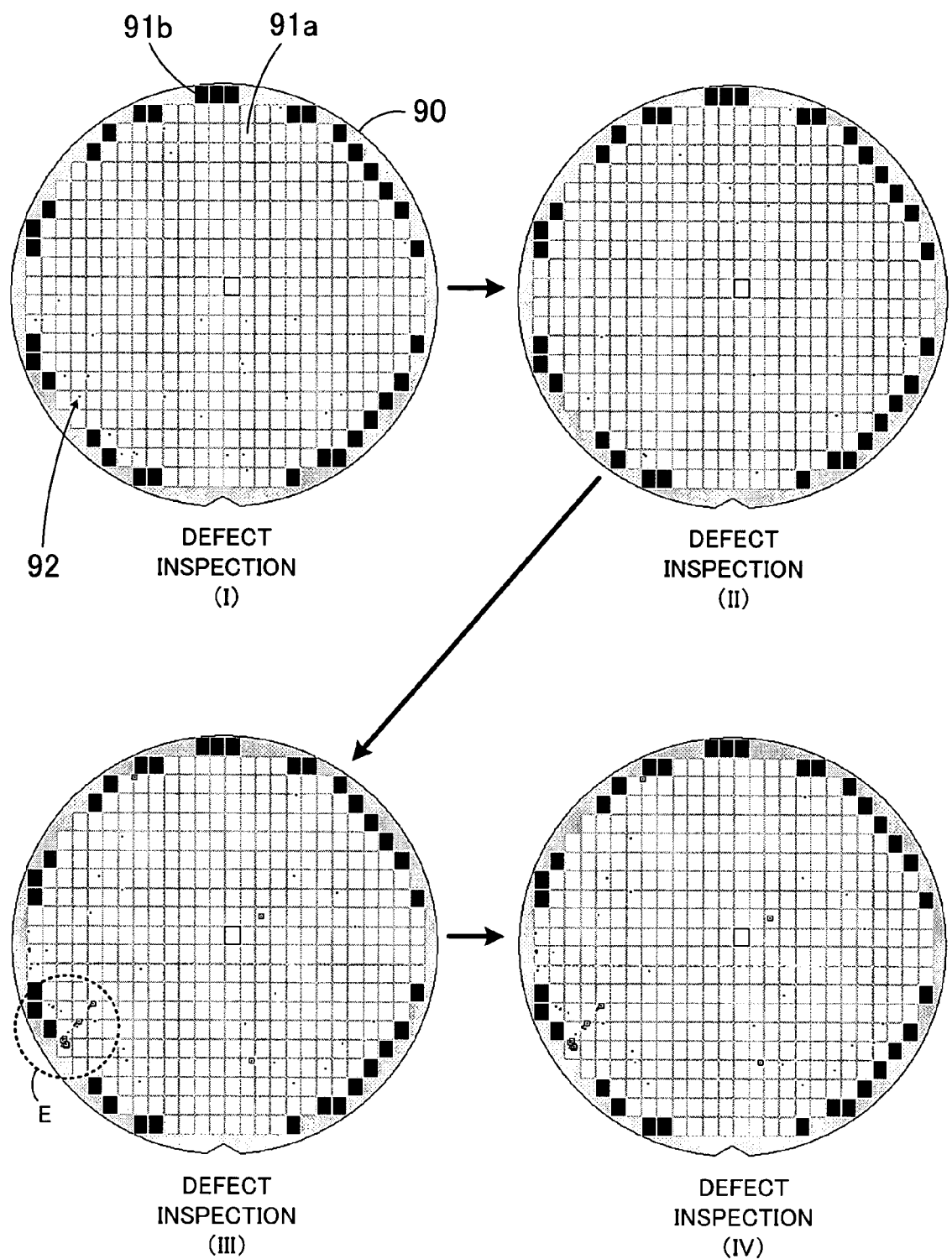
FIG. 20 shows a defect distribution on a wafer at each defect inspection stage.
Figure 21:
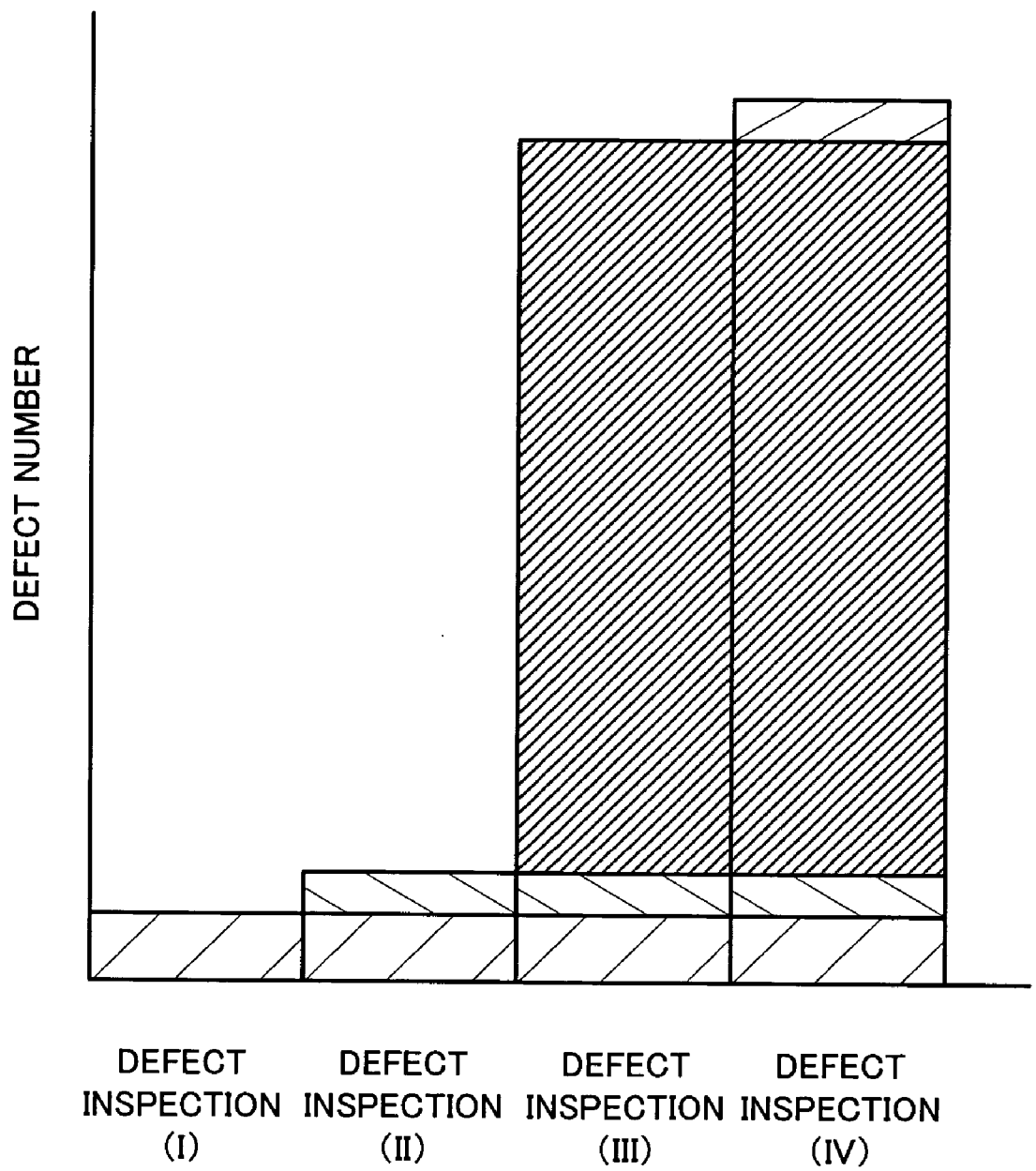
FIG. 21 shows the number of defects at each defect inspection stage.

FIG. 20 shows a defect distribution on the wafer at each defect inspection stage. FIG. 21 shows the number of defects at each defect inspection stage.

As shown in these FIGS. 20 and 21, on a Si wafer 90 having formed thereon chips 91a used as a product or other chips 91b, defects 92 are more or less detected at any stage of the respective defect inspections (I) to (IV). The respective defect inspections (I) to (IV) are viewed as follows. At the stages of the defect inspections (I) and (II), though the defects 92 are detected, the number thereof is comparatively small. However, the number of the defects 92 is suddenly increased at the stage of the defect inspection (III). Particularly, the defects 92 are generated collectively in the area E shown in FIG. 20 and in the periphery thereof. As a result, it is found that any one of the steps between the defect inspections (II) and (III) is an occurrence step of the defects 92. At the stage of the defect inspection (IV), though the defects 92 are detected, the number thereof is comparatively small, similarly to the results at the stages of the defect inspections (I) and (II).

Therefore, the trench etching step in FIG. 17, which is carried out immediately before the defect inspection (III), is further divided into three substeps of a primary etching substep to a tertiary etching substep. After finishing the respective substeps sequentially performed, an additional defect inspection is performed.

Figure 22:
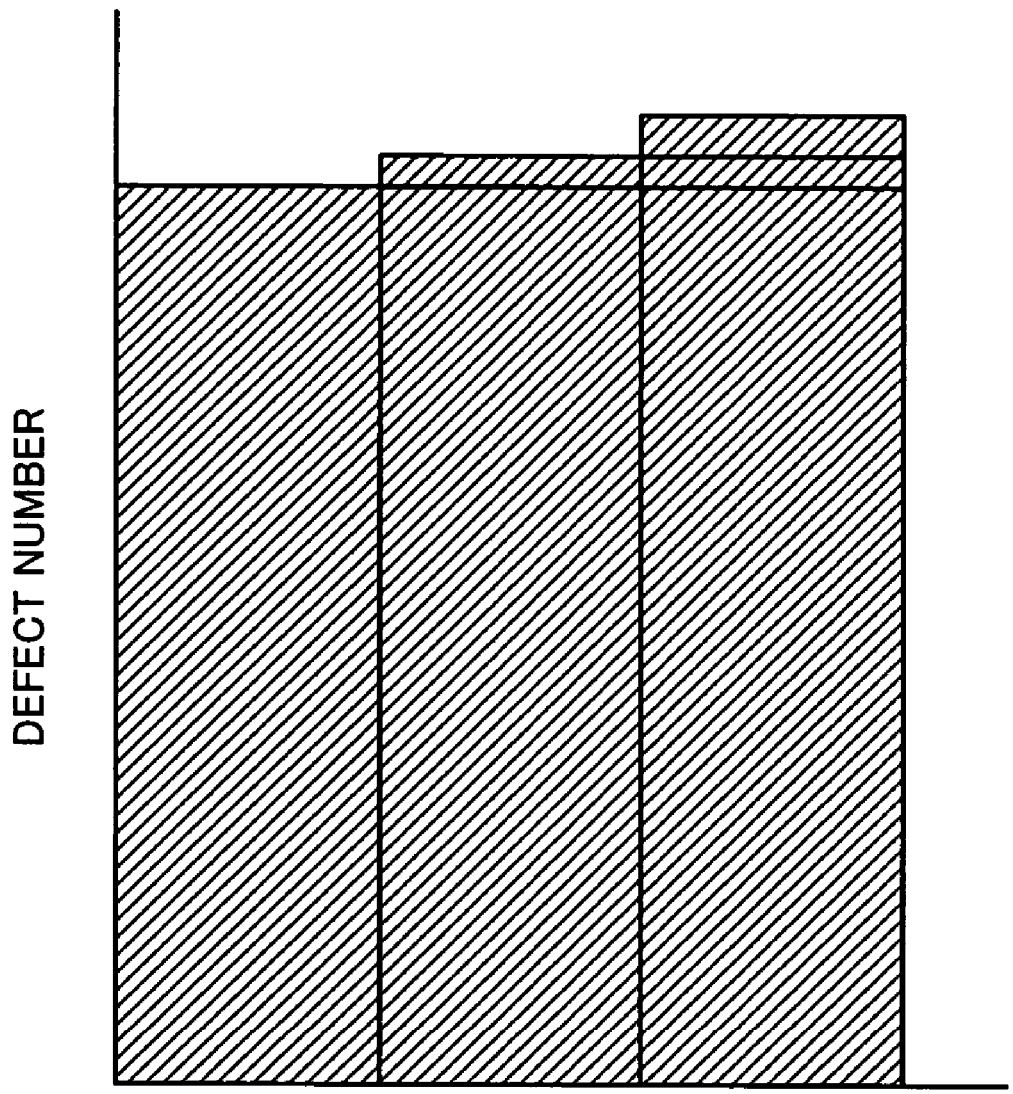
FIG. 22 shows the results of additional defect inspection.

FIG. 22 shows the results of the additional defect inspection.

As shown in FIG. 22, it is understood that in the trench etching step, the defects 92 already occur frequently at the stage of the primary etching substep which is performed in the beginning of the step.

Further, a typical defect inspection within the effective chip area is additionally performed after the resist pattern formation step for trench in FIG. 16. However, frequent occurrence of the defects 92 is not found at this stage. A tendency as shown in FIGS. 20 to 22 is not amended even if such measures that a cleaning period of the device is shortened are taken.

Subsequently, the respective defect inspections (I) to (IV) are performed using the device 8 and the SEM 1. Then, the same DSA processing analysis is performed using the inspection results. The scope to be inspected is widened up to the area other than the effective chip area. As a result, at the stages of the defect inspections (III) and (IV), abnormal discharge spots are found at approximately the same XY coordinates in the area other than the effective chip area and near an area E where the defects 92 concentrate, which is shown in FIG. 20. Based on this, the reason why the defects 92 frequently occur at the stage of the defect inspection (III) is considered as follows. Due to the defective spots which occur in the area other than the effective chip area before or during the processing in the trench etching step of FIG. 17, a processor causes abnormal discharge. From the defective spots, particles are spattered to extensively adhere to a surface of the wafer.

As described above, when performing the DSA processing analysis including an area other than the effective chip area, a source or cause of the defects can be specified. In addition, measures for preventing frequent occurrence of the defects can be taken based on the results.

Examples of the defect detection performed using the device 8 and the SEM 1 are described below.

EXAMPLE 1

Figure 23:
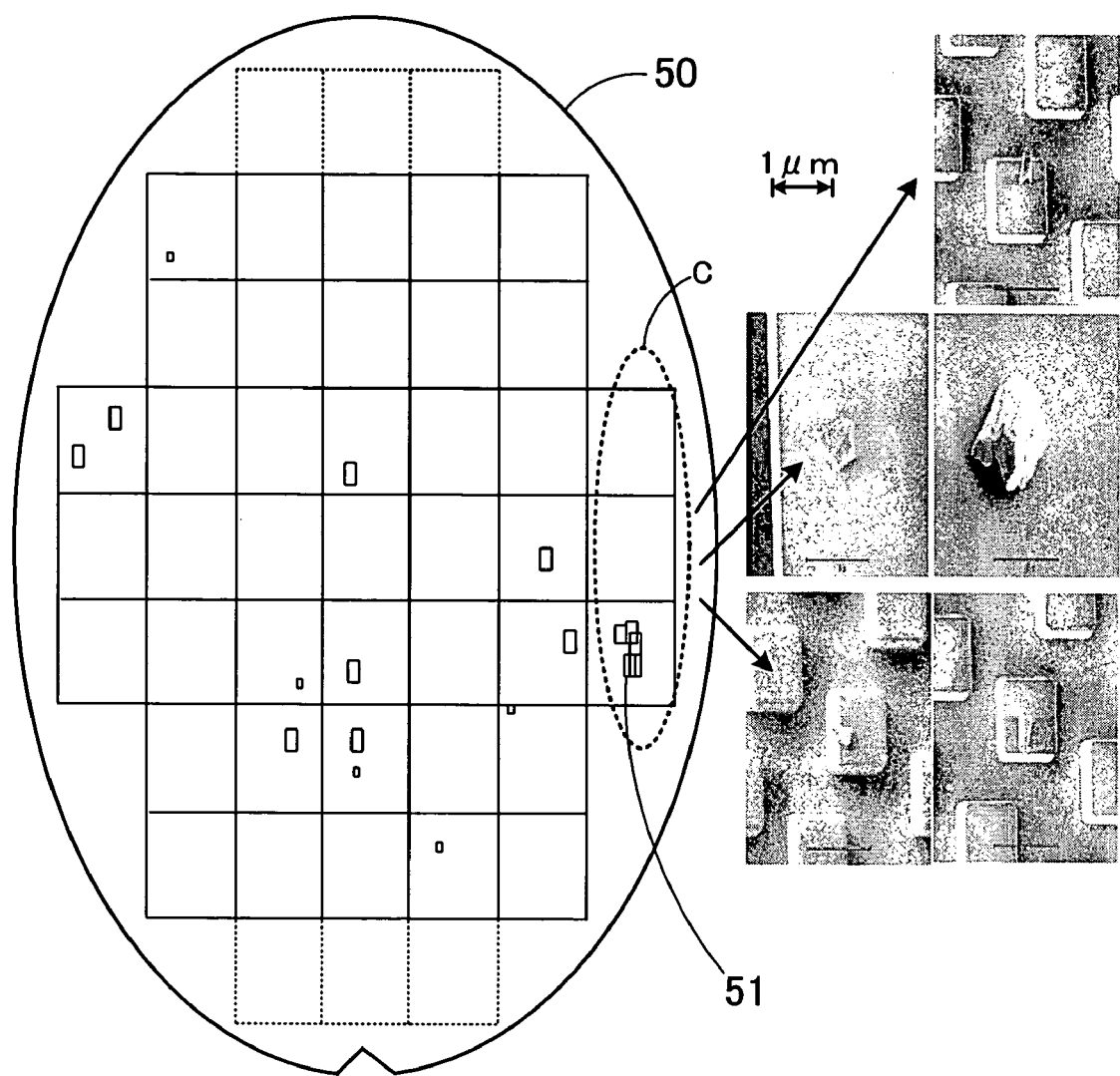
FIG. 23 shows positions of defects which are present in an effective chip area on a Si wafer and examples of SEM images of the defects.

FIG. 23 shows positions of defects which are present in the effective chip area on a Si wafer, and examples of SEM images of the defects. All of the SEM images shown in FIG. 23 are those of defects at defective spots found in the C part. All the defects are found at different positions.

FIG. 23 shows a position of a defect 51 which, when a certain pattern (not shown) is formed on a Si wafer 50 by dry etching, remains on a surface of the Si wafer 50 wet-processed. FIG. 23 simultaneously shows also the SEM images of the defects 51 present in the effective chip area (the chip area shown in full line) of the Si wafer 50. The defects 51 are detected by the device 8 and the SEM 1. A large number of spots to which foreign matters adhere are found on the surface of the Si wafer 50 wet-processed. However, the source of the foreign matters cannot be specified in such areas that the patterns are densely formed.

Figure 24:
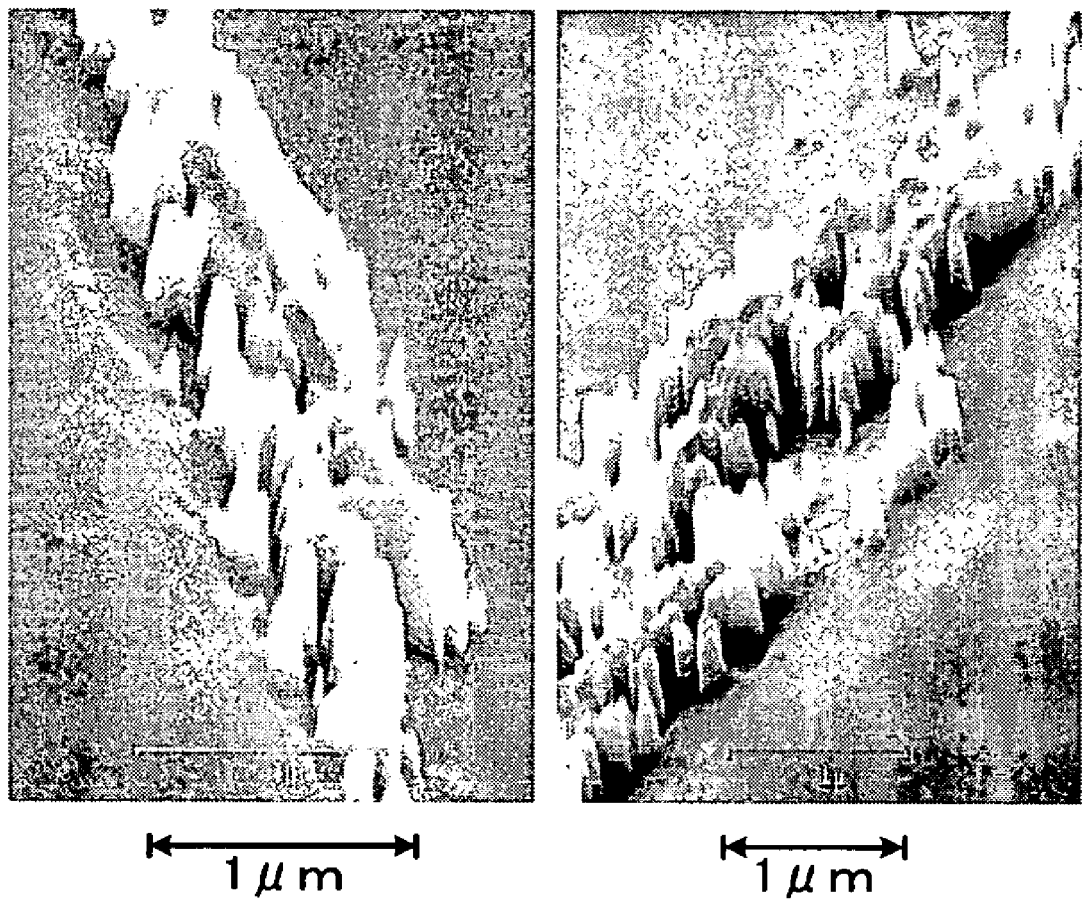
FIG. 24 shows examples of SEM images of defects which are present in an area other than the effective chip area.

FIG. 24 shows examples of the SEM images of defects which are present in the area other than the effective chip area.

When employing the device 8 and the SEM 1, the defect detection can be performed also on the surface of the Si wafer 50 in the area other than the effective chip area. FIG. 24 shows the SEM images of defects detected in the area other than the effective chip area. As shown in FIG. 24, the spots in which needle-shaped foreign matters are collectively present are found in the area other than the effective chip area of the Si wafer 50 wet-processed. The needle-shaped foreign matters are assumed to be a source of the foreign matters found in the effective chip area.

The foreign matters found in the area other than the effective chip area of the Si wafer 50 wet-processed are subjected to an Energy Dispersive X-ray spectrometer (EDX) measurement. As a result, it was found that the foreign matter is mainly Si. It is considered that during the Si etching, the needle-shaped etching residues aggregate into large masses, and a part of the masses flows into the effective chip area to adhere to the surface of the wafer during the wet processing, particularly, at the time of pulling up the Si wafer 50 from an etching solution.

EXAMPLE 2

Figure 25:
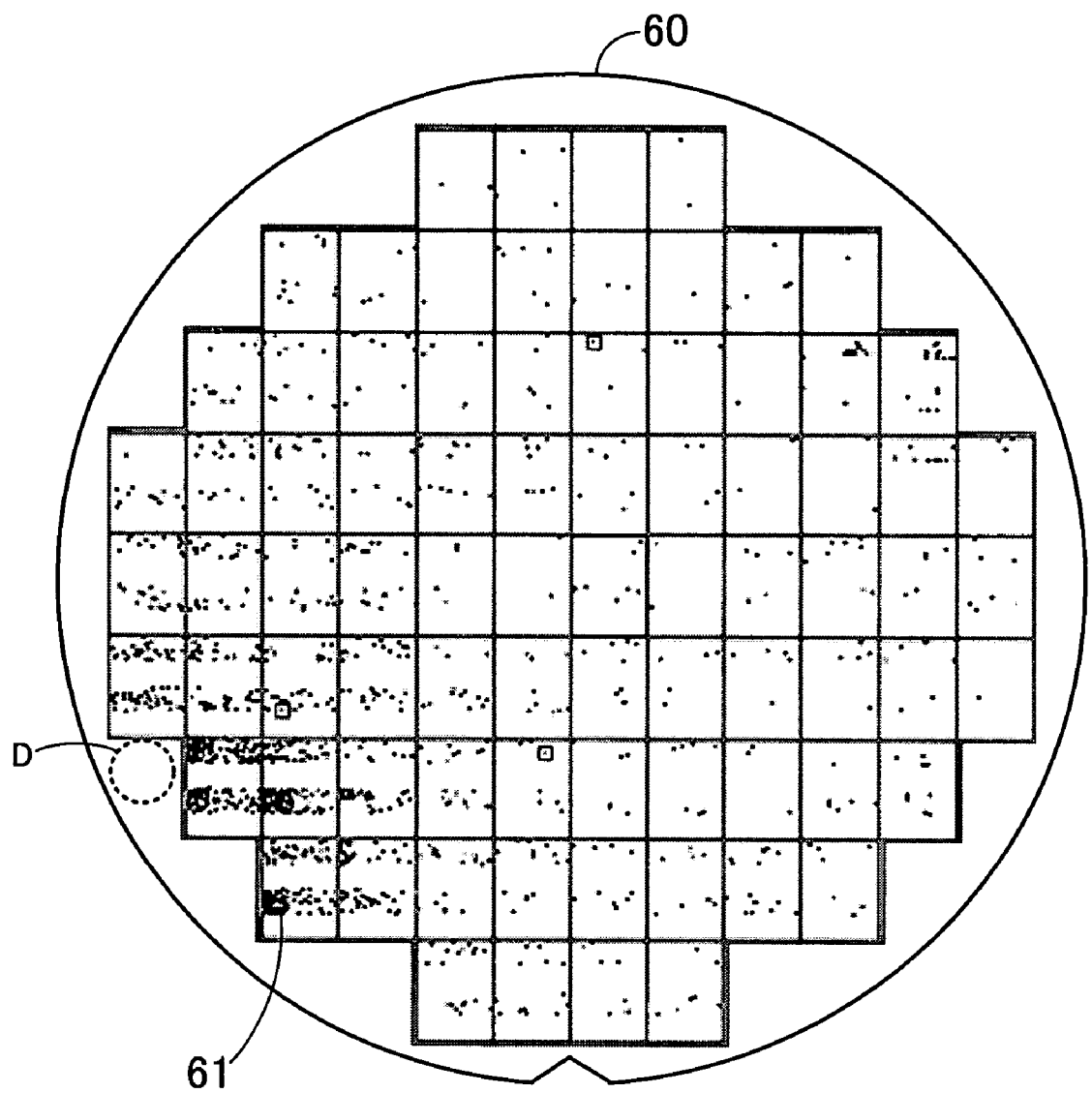
FIG. 25 shows positions of defects on a Si wafer.
Figure 26:
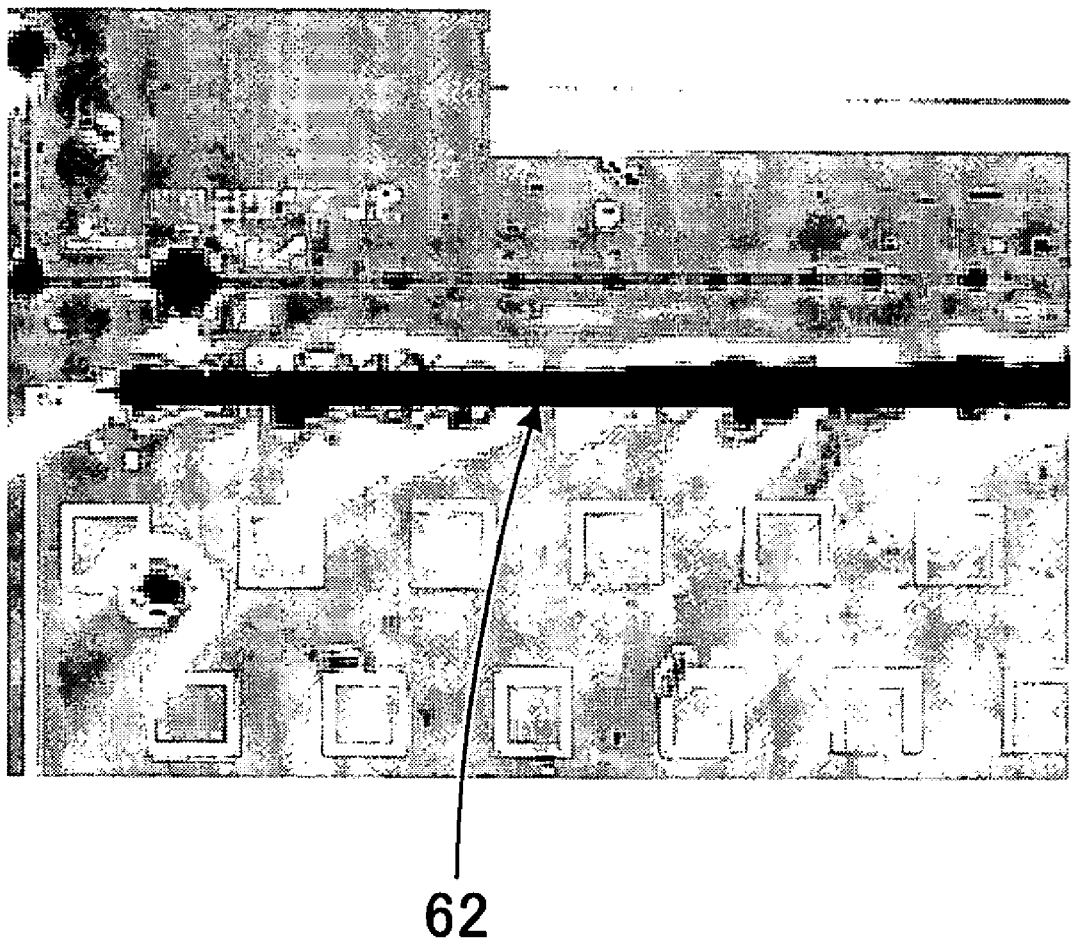
FIG. 26 shows an example of an SEM image of a defect on a Si wafer.

FIG. 25 shows positions of defects on a Si wafer. FIG. 26 shows an example of the SEM image of the defect on the Si wafer.

FIG. 25 shows positions of the defects remaining on the surface of the Si wafer 60 etching-processed. A large number of defects 61 are found throughout the surface of the Si wafer 60. Particularly, the defects 61 are found collectively in a part of the area. The DSA processing analysis is performed using the defect information acquired at the steps before the etching processing. As a result, an abnormal discharge spot 62 as shown in FIG. 26 is found in an area D other than the effective chip area and near the area where the defects 61 are found collectively. Based on this, it is assumed that the abnormal discharge is caused in the area other than the effective chip area during the etching processing, which causes the defects 61 throughout the surface of the Si wafer 60.

Therefore, an electrostatic chuck power supply of an etching device is improved into a power supply of a direct input-output so that the voltage can be controlled at both of the plus side and the minus side of the power supply. As a result, this abnormal discharge or foreign matter adhesion is prevented from occurring thereafter.

As described above, when the device 8 and the SEM 1 capable of performing the defect detection also of the area other than the effective chip area are employed, the source of the defect can be specified. Further, when the source of the defect is specified, the information is fed back to other manufacturing steps so that a suitable measure for preventing the defect from occurring can be taken. As a result, the yield of the products can be improved, and higher quality of the effective chip can be realized.

The surface inspection device configured by combining the defect review SEM and the defect inspection device, and the surface inspection method using the device are described above. However, the present invention can be applied also to a case where the defect review SEM or the defect inspection device is used alone as the surface inspection device. More specifically, the present device can have a configuration where when the X-Y coordinate system is set on the sample surface which is treated by each surface inspection device, each of the acquired inspection results can be stored in relation to the relevant X-Y coordinates. Further, the present invention can be similarly applied also to various review devices or inspection devices including an optical review device or a UV review device. The sample to be inspected is not limited to the above-described semiconductor wafer. The defect detection of liquid crystal panels, and other products and samples also can be similarly performed.

In the present invention, coordinates are set in an area from a center to a vicinity of an outer edge in the sample surface, and inspection results of the area are stored in relation to the coordinates in a position where the inspection results are acquired. Therefore, the inspection can be performed almost throughout the sample surface. Further, the acquired inspection results can be effectively used for an analysis. Accordingly, in the manufacturing process of products, for example, when product defects occur, the causes of the defects can be investigated with a higher degree of accuracy. As a result, the quality and yield of the products can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A surface inspection apparatus for performing an inspection of a wafer surface, comprising:
    a computer which sets a first coordinate system using a vertex of a quadrangle that a wafer touches internally as a first origin in an area from a center of the wafer to a vicinity of an outer edge in the wafer surface, and sets a second coordinate system using the center as a second origin in the area;
    a scanning electron microscope (SEM) which performs an inspection of the wafer surface using a scanning electron microscope (SEM) and determines coordinates of a defective spot with respect to the first origin, and acquires image data using the coordinates of the defective spot;
    a storage device which stores the image data of the defective spot in relation to coordinates with respect to the second origin in a position where the image data is acquired; and
    a display which outputs on a display unit the stored image data of the defective spot,
    wherein the area includes a first area where a chip is formed and a second area other than the first area.

2. The surface inspection apparatus according to claim 1, wherein the area is one from a center to a curved end face of an outer edge in the wafer.

3. The surface inspection apparatus according to claim 1, further comprising a unit which, when specific coordinates are specified, extracts and outputs the image data stored in relation to the specific coordinates.

4. A surface inspection method for performing an inspection of a wafer surface, comprising:
    setting a first coordinate system using a vertex of a quadrangle that a wafer touches internally as a first origin in an area from a center of the wafer to a vicinity of an outer edge in the wafer surface, and setting a second coordinate system using the center as a second origin in the area;
    performing an inspection of the wafer surface by a scanning electron microscope (SEM) and determining coordinates of a defective spot with respect to the first origin, and acquiring image data using the coordinates of the defective spot;
    storing the image data of the defective spot in relation to coordinates with respect to the second origin in a position where the image data is acquired; and
    outputting the stored image data of the defective spot on a display unit,
    wherein the area includes a first area where a chip is formed and a second area other than the first area.

5. The surface inspection method according to claim 4, wherein the area is one from a center to a curved end face of an outer edge in the wafer.

6. The surface inspection method according to claim 4, wherein when specific coordinates are specified, the image data stored in relation to the specific coordinates are extracted and outputted.

7. The surface inspection method according to claim 6, wherein the specific coordinates are ones on a specific area other than an effective chip area of the wafer.

8. The surface inspection method according to claim 4, wherein a Defect Source Analysis processing analysis is performed by comparing one stored inspection result of the area and another inspection result.

* * * * *